(12) United States Patent
Khan et al.

(10) Patent No.: US 12,323,257 B2
(45) Date of Patent: Jun. 3, 2025

(54) TRANSMISSION PARAMETER CONFIGURATION

(71) Applicant: Telefonaktiebolaget LM Ericsson (publ), Stockholm (SE)

(72) Inventors: Talha Khan, Santa Clara, CA (US); Xingqin Lin, Santa Clara, CA (US); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 531 days.

(21) Appl. No.: 17/631,915

(22) PCT Filed: Jul. 30, 2020

(86) PCT No.: PCT/IB2020/057234
§ 371 (c)(1),
(2) Date: Feb. 1, 2022

(87) PCT Pub. No.: WO2021/024121
PCT Pub. Date: Feb. 11, 2021

(65) Prior Publication Data
US 2022/0286242 A1    Sep. 8, 2022

Related U.S. Application Data

(60) Provisional application No. 62/882,326, filed on Aug. 2, 2019.

(51) Int. Cl.
*H04L 1/18* (2023.01)
*H04L 1/1867* (2023.01)
*H04W 72/23* (2023.01)

(52) U.S. Cl.
CPC ........... *H04L 1/1893* (2013.01); *H04W 72/23* (2023.01)

(58) Field of Classification Search
CPC ......... H04W 36/0069; H04W 36/0058; H04W 36/0072; H04W 36/0094;
(Continued)

(56) References Cited

U.S. PATENT DOCUMENTS 8,687,508 B2   4/2014   Marinier et al.
2008/0225766 A1*   9/2008   Roy et al. ..................... 370/310
(Continued)

FOREIGN PATENT DOCUMENTS

CA      2635874 A1 *   7/2007
CN      107949998 A      4/2018
(Continued)

OTHER PUBLICATIONS

Quan et al., WO 2017015963 A1: Communication Method and Communication Device (see title) (Year: 2017).*
(Continued)

*Primary Examiner* — Meless N Zewdu
(74) *Attorney, Agent, or Firm* — Murphy, Bilak & Homiller, PLLC

(57) ABSTRACT

Embodiments include methods for a wireless device. Such methods can include receiving, from a network node in a wireless network, control signaling that indicates a parameter configuration for data transmissions, by the network node or by the wireless device, that are associated with a subset of a plurality of hybrid ARQ, HARQ, processes. The indicated parameter configuration can be one of a plurality of parameter configurations corresponding to a respective plurality of different subsets of the HARQ processes. The different subsets can include a first subset of one or more HARQ processes for which HARQ feedback is disabled, and a second subset of one or more HARQ processes for which HARQ feedback is enabled. Other embodiments include complementary methods for a network node in a
(Continued)

Receiving, from a network node in a wireless network, control signaling that indicates a parameter configuration for data transmissions, by the network node or by the wireless device, that are associated with a subset of a plurality of hybrid ARQ (HARQ) processes, wherein the indicated parameter configuration is one of a plurality of parameter configurations corresponding to a respective plurality of different subsets of the HARQ processes, and the different subsets include:
a first subset of one or more HARQ processes for which HARQ feedback is disabled, and
a second subset of one or more HARQ processes for which HARQ feedback is enabled.
200

Transmitting or receiving the data transmissions, associated with the subset of the HARQ processes, according to the indicated parameter configuration.
210 wireless network, and wireless devices and network nodes configured to perform the respective methods.

22 Claims, 19 Drawing Sheets

(58) Field of Classification Search
CPC ......... H04W 36/00698; H04W 36/249; H04W 36/0088; H04W 24/10; H04W 36/0066; H04W 36/00; H04W 36/24; H04W 36/0061; H04W 36/0064; H04W 36/0085; H04W 28/0864; H04W 28/086; H04W 28/0861; H04W 28/0865; H04W 12/043; H04W 8/08; H04W 8/14; H04W 36/0005; H04W 72/20; H04W 72/231; H04W 72/232; H04W 72/27; H04W 88/00; H04W 88/02; H04W 88/08; H04W 88/18; H04W 88/06; H04W 92/20; H04W 92/02; H04W 92/00; H04W 76/27; H04W 76/00; H04W 76/10; H04W 76/11
See application file for complete search history.

(56) References Cited

U.S. PATENT DOCUMENTS

| | | | |
|---|---|---|---|
| 2014/0056278 A1* | 2/2014 | Marinier et al. | .... H04W 72/044 |
| 2016/0261391 A1 | 9/2016 | Chen et al. | |
| 2018/0262302 A1 | 9/2018 | Bergström et al. | |
| 2021/0314100 A1* | 10/2021 | Yeo et al. | ............. H04L 1/1819 |
| 2022/0272726 A1* | 8/2022 | Wang | ................ H04W 72/1263 |
| 2022/0368475 A1* | 11/2022 | Lei | ........................ H04L 1/1896 |

FOREIGN PATENT DOCUMENTS

| | | | | |
|---|---|---|---|---|
| JP | | 2010502107 A | 1/2010 | |
| JP | | 2018509834 A | 4/2018 | |
| WO | WO 2013112703 A2 * | | 8/2013 | ............... H04L 1/18 |
| WO | WO 2014088295 A1 * | | 6/2014 | ............ H04W 16/32 |
| WO | WO 2018169937 A1 * | | 9/2018 | ............... H04L 1/18 |
| WO | | 2020064512 A1 | 4/2020 | |

OTHER PUBLICATIONS

Zhu, Ya-jun; CN 109155702 A; Transmission Of HARQ Feedback Information Method, Device, Base Station And Terminal (see title) (Year: 2019).*
Wang et al. CN 106559187 A; HARQ-ACK Information Feedback And Receiving Method And Device (see title) (Year: 2017).*
Amuru et al., (CN 110301110 A) >>> Method And User Equipment UE For HARQ Process Managing A Plurality Of Digital Parameter Configuration (see title) (Year: 2019).*
Liu, Xiao-feng, (CN 110035508 A) >>> A Mobile Communication Downlink Multi-slot Scheduling Method And System (title) (Year: 2019).*
"Considerations on HARQ Management for Non-Terrestrial Networks", 3GPP TSG RAN WG1 Meeting #92, R1-1802631, Athens, Greece, Feb. 26-Mar. 2, 2018, pp. 1-4.
"HARQ Options for NTN", 3GPP TSG-RAN WG2 Meeting #106, R2-1908247, Reno, USA, May 13-17, 2019, pp. 1-2.
"Configuration for HARQ turning off", 3GPP TSG-RAN WG2 #106'; R2-1907553; Reno, USA, May 13-17, 2019, pp. 1-2.
"Discussion on the HARQ procedure for NTN", 3GPP TSG RAN WG1 #97; R1-1906873; Reno, USA, May 13-17, 2019, pp. 1-4.
"On switching off HARQ for NTN", 3GPP TSG-RAN WG2 #106; Tdoc R2-1907297; Reno, Nevada, May 13-17, 2019, pp. 1-5.
"Study on solutions evaluation for NR to support Non Terrestrial Network", 3GPP TSG RAN meeting #80; RP-181370; La Jolla, USA, Jun. 11-14, 2018, pp. 1-5.
"Summary for more delay-tolerant re-transmission mechanisms in NR-NTN", 3GPP TSG RAN WG1 Meeting #97; R1-1907757; Reno, Nevada, May 13-17, 2019, pp. 1-8.
"3GPP TR 38.811 V15.1.0", 3rd Generation Partnership Project; Technical Specification Group Radio Access Network; Study on New Radio (NR) to support non-terrestrial networks (Release 15), Jun. 2019, pp. 1-126.

* cited by examiner

Receiving, from a network node in a wireless network, control signaling that indicates a parameter configuration for data transmissions, by the network node or by the wireless device, that are associated with a subset of a plurality of hybrid ARQ (HARQ) processes, wherein the indicated parameter configuration is one of a plurality of parameter configurations corresponding to a respective plurality of different subsets of the HARQ processes, and the different subsets include:
a first subset of one or more HARQ processes for which HARQ feedback is disabled, and
a second subset of one or more HARQ processes for which HARQ feedback is enabled.
200

Transmitting or receiving the data transmissions, associated with the subset of the HARQ processes, according to the indicated parameter configuration.
210

Figure 2A

RECEIVING, FROM A NETWORK NODE, CONTROL SIGNALING THAT INDICATES DIFFERENT PARAMETER CONFIGURATIONS ACCORDING TO WHICH TRANSMISSIONS FOR DIFFERENT SUBSETS OF ONE OR MORE ERROR CONTROL PROCESSES ARE TO BE PERFORMED
220

TRANSMITTING OR RECEIVING TRANSMISSIONS FOR DIFFERENT SUBSETS OF ONE OR MORE ERROR CONTROL PROCESSES ACCORDING TO DIFFERENT PARAMETER CONFIGURATIONS
230

Figure 2B

Receiving, from the network node via a physical DL control channel (PDCCH), a set of downlink control information (DCI) that indicates respective schedules for the set of DL transmissions.
235

Receiving, from the network node via a physical DL shared channel (PDSCH), the set of DL transmissions according to the respective schedules.
240

Transmitting, to the network node, hybrid ARQ (HARQ) feedback for a set of downlink (DL) transmissions by the network node, wherein the HARQ feedback is based on a HARQ feedback codebook that comprises: a first entry, corresponding to a first HARQ process for which HARQ feedback is disabled, that indicates that HARQ feedback for a DL transmission is encoded as a negative acknowledgement; and a second entry, corresponding to a second HARQ process for which HARQ feedback is enabled, that indicates that HARQ feedback for a DL transmission is encoded based on a decoding outcome of the DL transmission.
250

Figure 2C

RECEIVING A DOWNLINK CONTROL INFORMATION MESSAGE THAT SCHEDULES A DOWNLINK TRANSMISSION FOR A CERTAIN ERROR CONTROL PROCESS AND THAT INCLUDES A SET OF ONE OR MORE FIELDS WHOSE INTERPRETATION DEPENDS ON WHETHER ERROR CONTROL FEEDBACK IS ENABLED OR DISABLED FOR THE CERTAIN ERROR CONTROL PROCESS
260

INTERPRETING THE SET OF ONE OR MORE FIELDS DEPENDING ON WHETHER ERROR CONTROL FEEDBACK IS ENABLED OR DISABLED FOR THE CERTAIN ERROR CONTROL PROCESS
270

RECEIVING THE DOWNLINK TRANSMISSION IN ACCORDANCE WITH THE RECEIVED DOWNLINK CONTROL INFORMATION MESSAGE
280

Figure 2D

Transmitting, to a wireless device, control signaling that indicates a parameter configuration for data transmissions, by the network node or by the wireless device, that are associated with a subset of a plurality of hybrid ARQ (HARQ) processes, wherein the indicated parameter configuration is one of a plurality of parameter configurations corresponding to a respective plurality of different subsets of the HARQ processes, and the different subsets include:
a first subset of one or more HARQ processes for which HARQ feedback is disabled, and
a second subset of one or more HARQ processes for which HARQ feedback is enabled.
300

Transmitting or receiving the data transmissions, associated with the subset of the HARQ processes, according to the indicated parameter configuration.
310

Figure 3A

TRANSMITTING, FROM THE NETWORK NODE TO THE WIRELESS DEVICE, CONTROL SIGNALING THAT INDICATES DIFFERENT PARAMETER CONFIGURATIONS ACCORDING TO WHICH TRANSMISSIONS FOR DIFFERENT SUBSETS OF ONE OR MORE ERROR CONTROL PROCESSES ARE TO BE PERFORMED
320

TRANSMITTING OR RECEIVING TRANSMISSIONS FOR DIFFERENT SUBSETS OF ONE OR MORE ERROR CONTROL PROCESSES ACCORDING TO DIFFERENT PARAMETER CONFIGURATIONS
330

Figure 3B

Transmit, to the wireless device, via a physical DL control channel (PDCCH), a set of downlink control information (DCI) that indicates respective schedules for a set of DL transmissions by the network node.
335

Transmit, to the wireless device via a physical DL shared channel (PDSCH), the set of DL transmissions according to the respective schedules.
340

Receive, from the wireless device, hybrid ARQ (HARQ) feedback for the set of downlink (DL) transmissions, wherein the HARQ feedback is based on a HARQ feedback codebook that comprises:
a first entry, corresponding to a first HARQ process for which HARQ feedback is disabled, that indicates that HARQ feedback for a DL transmission is encoded as a negative acknowledgement; and
a second entry, corresponding to a second HARQ process for which HARQ feedback is enabled, that indicates that HARQ feedback for a DL transmission is encoded based on a decoding outcome of the DL transmission.
350

Figure 3C

ENCODING THE SET OF ONE OR MORE FIELDS DEPENDING ON WHETHER ERROR CONTROL FEEDBACK IS ENABLED OR DISABLED FOR THE CERTAIN ERROR CONTROL PROCESS
360

TRANSMITTING A DOWNLINK CONTROL INFORMATION MESSAGE THAT SCHEDULES A DOWNLINK TRANSMISSION FOR A CERTAIN ERROR CONTROL PROCESS AND THAT INCLUDES A SET OF ONE OR MORE FIELDS WHOSE INTERPRETATION DEPENDS ON WHETHER ERROR CONTROL FEEDBACK IS ENABLED OR DISABLED FOR THE CERTAIN ERROR CONTROL PROCESS
370

TRANSMITTING THE DOWNLINK TRANSMISSION IN ACCORDANCE WITH THE TRANSMITTED DOWNLINK CONTROL INFORMATION MESSAGE
380

Figure 3D

| Counter DAI | Total DAI | | Counter DAI | Total DAI | | Counter DAI | Total DAI |
|---|---|---|---|---|---|---|---|
| 2 | 2 | | | 3 | | 5 | 5 |
| 1 | 2 | | 3 | 3 | | 4 | 5 |

Serving Cell 1
Serving Cell 0
Monitoring occasion: 0 1 2

■ DCI present

Figure 9

TRANSMISSION PARAMETER CONFIGURATION

TECHNICAL FIELD

The present application relates generally to the field of wireless networks and more specifically to techniques for improving error control procedures (e.g., hybrid ARQ) for data transmissions, such as in non-terrestrial networks where such transmissions can experience relatively long propagation delays.

INTRODUCTION

Some types of error control procedures, such as those based on hybrid automatic repeat request (HARQ) at the PHY/MAC layer, require a transmitter to wait for acknowledgement feedback from the receiver before performing a (re)transmission of data. This stop-and-wait mechanism coupled with propagation delay introduces inherent latency to the communication protocol, which threatens to reduce link throughput. To alleviate this issue, some approaches allow multiple error control processes (e.g., HARQ processes) to be activate at the same time, so that the transmitter can initiate multiple transmissions in parallel according to different error control processes. This way, transmissions for one error control process do not require the transmitter to wait for acknowledgement feedback of another error control process.

The number of error control processes that are able to be active at the same time can theoretically be increased to allow the error control mechanism to cope with larger propagation delays, such as those that may be present in non-terrestrial networks. However, increasing the number of error control processes requires large memories at the transmitter and receiver, requires reducing the maximum supported transport block size, and increases the signalling overhead. Error control procedures may therefore be ill-suited to wireless communication networks with large propagation delay, such as non-terrestrial networks. Disabling the error control procedures in non-terrestrial networks would avoid these implications but would cause packet loss. This packet loss would in turn trigger higher layer retransmission protocols. And the higher layer retransmission protocols would introduce additional latency, thereby upsetting the very purpose of disabling the error control procedures.

SUMMARY

Embodiments of the present disclosure provide specific improvements to wireless communications between wireless devices and a wireless network, such as by facilitating solutions to overcome the exemplary problems summarized above and described in more detail below.

Embodiments include exemplary methods (e.g., procedures) for a wireless device. These embodiments can include receiving, from a network node in a wireless network, control signaling that indicates a parameter configuration for data transmissions, by the network node or by the wireless device, that are associated with a subset of a plurality of hybrid ARQ (HARQ) processes. The indicated parameter configuration can be one of a plurality of parameter configurations corresponding to a respective plurality of different subsets of the HARQ processes. The different subsets can include a first subset of one or more HARQ processes for which HARQ feedback is disabled, and a second subset of one or more HARQ processes for which HARQ feedback is enabled.

In some embodiments, these exemplary methods can also include transmitting or receiving the data transmissions, associated with the subset of the HARQ processes, according to the indicated parameter configuration.

In some embodiments, the indicated parameter configuration is for a single HARQ process or for all HARQ processes of a single type. In other embodiments, the indicated parameter configuration is for all HARQ processes for which HARQ feedback is enabled, or for all HARQ processes for which HARQ feedback is disabled.

In some embodiments, the parameter configuration corresponding to the first subset can differ from the parameter configuration corresponding to the second subset in one or more of the following parameters:
  aggregation factor indicating a number of consecutive slots scheduled by downlink control information;
  transmission waveform type;
  modulation and coding scheme table;
  time domain resource allocation table;
  type of frequency resource allocation;
  block error rate target;
  physical resource block bundling configuration;
  type of physical downlink shared channel mapping; or
  physical uplink shared channel transmission scheme.

Other embodiments include other exemplary methods (e.g., procedures) for a wireless device. These exemplary methods can include transmitting, to a network node in a wireless network, hybrid ARQ (HARQ) feedback for a set of downlink (DL) transmissions by the network node. The HARQ feedback can be based on a HARQ feedback codebook that includes:
  a first entry, corresponding to a first HARQ process for which HARQ feedback is disabled, that indicates that HARQ feedback for a DL transmission is encoded as a negative acknowledgement; and
  a second entry, corresponding to a second HARQ process for which HARQ feedback is enabled, that indicates that HARQ feedback for a DL transmission is encoded based on a decoding outcome of the DL transmission.

In some embodiments, the HARQ feedback codebook can be a Type-1 HARQ-ACK codebook, as described elsewhere herein.

In some embodiments, the exemplary method can also include receiving, from the network node via a physical DL control channel (PDCCH), a set of downlink control information (DCI) that indicates respective schedules for the set of DL transmissions; and receiving, from the network node via a physical DL shared channel (PDSCH), the set of DL transmissions according to the respective schedules.

In some of these embodiments, a position of the first entry in the HARQ feedback codebook can be based on a slot timing offset included in a DCI that schedules a DL transmission associated with the first HARQ process. Likewise, a position of the second entry in the HARQ feedback codebook can be based on a slot timing offset included in a DCI that schedules a DL transmission associated with the second HARQ process.

Other embodiments include exemplary methods (e.g., procedures) for a network node in a wireless network. These exemplary methods can include transmitting, to a wireless device, control signaling that indicates a parameter configuration for data transmissions, by the network node or by the wireless device, that are associated with a subset of a plurality of hybrid ARQ (HARQ) processes. The indicated parameter configuration can be one of a plurality of parameter configurations corresponding to a respective plurality of different subsets of the HARQ processes. The different subsets can include a first subset of one or more HARQ processes for which HARQ feedback is disabled, and a second subset of one or more HARQ processes for which HARQ feedback is enabled.

In some embodiments, these exemplary methods can also include transmitting or receiving the data transmissions, associated with the subset of the HARQ processes, according to the indicated parameter configuration.

In some embodiments, the indicated parameter configuration can be for a single HARQ process or for all HARQ processes of a single type. In other embodiments, the indicated parameter configuration can be for all HARQ processes for which HARQ feedback is enabled, or for all HARQ processes for which HARQ feedback is disabled.

In some embodiments, the parameter configuration corresponding to the first subset can differ from the parameter configuration corresponding to the second subset in one or more of the following parameters:
- aggregation factor indicating a number of consecutive slots scheduled by downlink control information;
- transmission waveform type;
- modulation and coding scheme table;
- time domain resource allocation table;
- type of frequency resource allocation;
- block error rate target;
- physical resource block bundling configuration;
- type of physical downlink shared channel mapping; or Other embodiments include other exemplary methods (e.g., procedures) for a network node in a wireless network. These exemplary methods can include receiving, from a wireless device, hybrid ARQ (HARQ) feedback for a set of downlink (DL) transmissions by the network node. The HARQ feedback can be based on a HARQ feedback codebook that includes:
- a first entry, corresponding to a first HARQ process for which HARQ feedback is disabled, that indicates that HARQ feedback for a DL transmission is encoded as a negative acknowledgement; and
- a second entry, corresponding to a second HARQ process for which HARQ feedback is enabled, that indicates that HARQ feedback for a DL transmission is encoded based on a decoding outcome of the DL transmission.

In some embodiments, the HARQ feedback codebook can be a Type-1 HARQ-ACK codebook, as described elsewhere herein.

In some embodiments, these exemplary methods can also include transmitting, to the wireless device via a physical DL control channel (PDCCH), a set of downlink control information (DCI) that indicates respective schedules for the set of DL transmissions; and transmitting, to the wireless device via a physical DL shared channel (PDSCH), the set of DL transmissions according to the respective schedules.

In some of these embodiments, a position of the first entry in the HARQ feedback codebook can be based on a slot timing offset included in a DCI that schedules a DL transmission associated with the first HARQ process. Likewise, a position of the second entry in the HARQ feedback codebook can be based on a slot timing offset included in a DCI that schedules a DL transmission associated with the second HARQ process.

Other embodiments include network nodes (e.g., base stations, eNBs, gNBs, etc., or components thereof) and wireless devices (e.g., user equipment) configured to perform operations corresponding to any of the exemplary methods described herein. Other embodiments include non-transitory, computer-readable media storing program instructions that, when executed by processing circuitry of such network nodes or UEs, configure the same to perform operations corresponding to any of the exemplary methods described herein.

These and other objects, features, and advantages of embodiments of the present disclosure will become apparent upon reading the following Detailed Description in view of the Drawings briefly summarized below.

BRIEF DESCRIPTION OF THE DRAWINGS

FIG. 2, which includes FIGS. 2A-D, depicts various methods performed by a wireless device according to some embodiments.

FIG. 3, which includes FIGS. 3A-D, depicts various methods performed by a network node according to some embodiments.

FIG. 9 illustrates an example in which a user equipment (UE) is configured with two serving cells and three physical downlink control channel (PDCCH) monitoring occasions, according to some embodiments.

DETAILED DESCRIPTION

Figure 1:
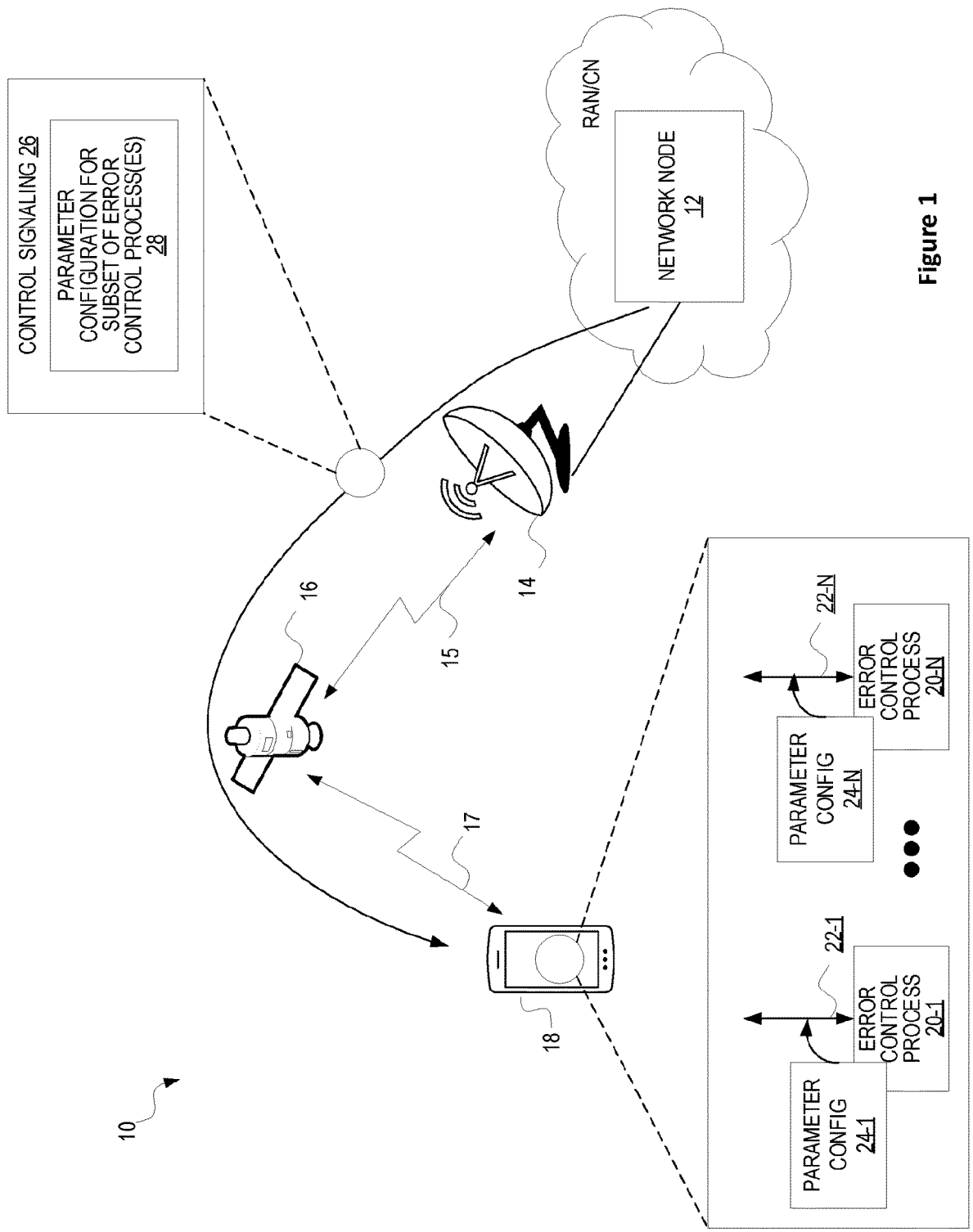
FIG. 1 shows a communication network according to some embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a PDN Gateway (P-GW), a Policy and Charging Rules Function (PCRF), an access and mobility management function (AMF), a session management function (SMF), a user plane function (UPF), a Charging Function (CHF), a Policy Control Function (PCF), an Authentication Server Function (AUSF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

FIG. 1 shows a communication network 10 according to some embodiments. The network 10 may for instance be a non-terrestrial network (NTN), also referred to as a satellite-based radio access network. In some embodiments, the network 10 is a radio access network for a cellular communications networks, such as a Long Term Evolution (LTE) or New Radio (NR) network.

As illustrated, the network 10 includes a network node 12, e.g., in a radio access network (RAN) or core network (CN) of a wireless communications network. The network node 12 may for instance be a radio network node (e.g., a base station). Regardless, the network node 12 as shown is connected to a ground-based base station antenna 14 that is, in this example, remote from (i.e., not collocated with) the network node 12. The network 10 also includes a satellite 16, which is a space-borne platform, that is connected to the ground-based base station antenna 14 via a feeder link 15. that provides a satellite-based service link 17 to a wireless device 18, e.g., located in a respective spotbeam, or cell.

Depending on the functionality of the satellite 406 in the satellite-based radio access network 400, two transponder options can be considered. With a bent pipe transponder, the satellite 16 forwards the received signal back to the earth with only amplification and a shift from uplink frequency to downlink frequency. With a regenerative transponder, the satellite 16 includes on-board processing to demodulate and decode the received signal and regenerate the signal before sending it back to the earth.

In this context, the wireless device 18 supports multiple error control processes 20-1 . . . 20-N being active at the same time. The error control processes 20-1 . . . 20-N may for instance take the form of multiple HARQ processes, e.g., controlled by a MAC layer. This means that the wireless device 18 is able to transmit or receive multiple transmissions in parallel according to different ones of the error control processes 20-1 . . . 20-N. For example, the wireless device 18 is able to transmit or receive transmissions 22-1 according to error control process 20-1 in parallel with transmitting or receiving transmissions 22-N according to error control process 20-N. If the transmissions 22-1, 22-N are uplink transmissions, then, the wireless device 18 may transmit transmissions 22-1 according to error control process 20-1 without having to wait for acknowledgement feedback for transmissions 22-N performed according to error control process 20-N.

Notably, some embodiments herein enable transmission parameters to be configured on an error control process by error control process basis, on an error control process type by error control process type basis, or any other basis that enables different subsets of the error control processes 20-1 . . . 20-N to have respective transmission parameter configurations. Some embodiments thereby enable transmission parameters to be configured differently for different error control processes 20-1 . . . 20-N. That is, parameters of transmissions 22-1 . . . 22-N for different error control processes 20-1 . . . 20-N are able to be (but do not necessarily have to be) configured differently. As shown in FIG. 1, for example, the wireless device may transmit or receive transmissions 22-1 for error control process 20-1 according to parameter configuration 24-1, and transmit or receive transmissions 22-N for error control process 20-N according to parameter configuration 24-N.

In some embodiments, for instance, any of the parameter configurations 24-1 . . . 24-N may include a configuration of one or more power control parameters. The one or more power control parameters may include for instance one or more of: a nominal target received power, a pathloss compensation factor, a delta modulation and coding scheme, a transmit power control accumulation, a number of power control adjustment states maintained by the wireless device, or a parameter that maps a transmit power control command field in downlink control information to an absolute or accumulated closed loop power control value. Here, a nominal target received power may be a sum of a cell-specific component and a device-specific component, a pathloss compensation factor may determine how much an estimated pathloss needs to be compensated by a transmit power for the transmissions, a delta modulation and coding scheme parameter may determine whether a factor that is a function of a modulation and coding scheme is added or not to calculate a transmit power for the transmissions, and/or a transmit power control accumulation may determines whether a power control command is applied with accumulation or not.

Alternatively or additionally, any of the parameter configurations 24-1 . . . 24-N may include a configuration of actual transmit power level. For example, such configuration may be a configuration as to whether or not transmissions are to be performed with maximum transmit power.

Alternatively or additionally, any of the parameter configurations 24-1 . . . 24-N may include a configuration of one or more of: an aggregation factor indicating a number of consecutive downlink slots scheduled by downlink control information; a transmission waveform type; a modulation and coding scheme table; a time domain resource allocation table; a type of frequency resource allocation; a block error rate target; a physical resource block bundling configuration; a type of physical downlink shared channel mapping; or a physical uplink shared channel transmission scheme.

Regardless of the particular parameters configured by the parameter configurations 24-1 . . . 24-N, one or more of the parameter configurations 24-1 . . . 24-N may be signaled by the network node 12 according to some embodiments. That is, in some embodiments as shown, the network node 12 transmits control signaling 26 to the wireless device 18 for transmission parameter configuration. The control signaling 26 in this regard indicates a parameter configuration 28 according to which transmissions for a certain subset of one or more error control processes are to be performed (where a subset herein refers to a proper subset in mathematical terms, i.e., a portion of a larger set). Where the certain subset includes just error control process 20-1, for example, the control signaling may indicate the parameter configuration 28 according to which transmissions for error control process 20-1 are to be performed, e.g., indicating parameter configuration 24-1.

In some embodiments, the one or more error control processes in the certain subset may include one or more error control processes that are identified by one or more respective error control process identities. The control signaling 26 may in this case indicate the one or more respective error control process identities. Accordingly, the control signaling 26 may include a parameter configuration 28 as well as the identity of an error control process whose transmissions are to be performed according to that parameter configuration 28.

In another example, the one or more error control processes in the certain subset include any error control process of a certain type. In these and other embodiments, for example, the one or more error control processes in the certain subset include any error control process for which error control feedback is disabled or include any error control process for which error control feedback is enabled.

More specifically in this regard, transmission parameters according to some embodiments may be configured differently for different error control processes 20-1 . . . 20-N, depending on whether error control feedback is enabled or disabled for those respective error control processes. That is, in some embodiments, error control feedback for any given error control process may be selectively enabled or disabled, e.g., on a dynamic or semi-static basis such as via a MAC control element (CE) or via RRC signalling. For example, error control feedback may be enabled for an error control process that is associated with a delay-tolerant application or that requires transmission reliability as the chief concern, but may be disabled for an error control process that is associated with a delay-intolerant application or that requires transmission latency or throughput as the chief concern. In this context, transmission parameters may be configured to make transmissions more reliable for an error control process with feedback disabled, as compared to an error control process with feedback enabled. Configuring transmissions to be more reliable for an error control process with feedback disabled may advantageously mitigate packet loss and the triggering of higher layer retransmission protocols, so as to correspondingly improve transmission latency.

In this case, then, the control signalling 26 in some embodiments may indicate a parameter configuration 28 according to which transmissions are to be performed for any error control process for which feedback is disabled. Or, the control signalling 26 may indicate a parameter configuration 28 according to which transmissions are to be performed for any error control process for which feedback is enabled.

Although the control signalling 26 is illustrated with respect to one certain subset, the control signalling 26 may generally indicate different parameter configurations according to which transmissions for different subsets of one or more error control processes are to be performed. For example, the different subsets may include a subset of one or more error control processes for which error control feedback is disabled and a subset of one or more error control processes for which error control feedback is enabled.

Note that, in some embodiments, when error control feedback is disabled for an error control process, transmissions are still scheduled with an error control process ID/number, e.g., in downlink control information (DCI) messages. But the transmitting node does not expect to receive (explicit or implicit) acknowledgement feedback or schedule retransmissions.

In view of the above modifications and variations, FIGS. 2A-2D depict various exemplary methods (e.g., procedures) for a wireless device 18 (such shown in FIG. 1) in accordance with various exemplary embodiments. Similarly, FIGS. 3A-3D depict various exemplary methods (e.g., procedures) for a network node 12 (such shown in FIG. 1) in accordance with various exemplary embodiments. Although the exemplary methods are illustrated in FIGS. 2A-2D and 3A-3D by specific blocks in particular orders, the operations corresponding to the blocks can be performed in different orders than shown and can be combined and/or divided into blocks having different functionality than shown. Furthermore, various exemplary methods shown in FIGS. 2A-2D and 3A-3D can be complementary to each other, such that they can be used cooperatively to provide various benefits, advantages, and/or solutions to problems, including those described herein. Optional blocks and/or operations are indicated by dashed lines.

In the exemplary method shown in FIG. 2A, the wireless device can receive (e.g., in block 200), from a network node in a wireless network, control signaling that indicates a parameter configuration (e.g., 28 shown in FIG. 1) for data transmissions, by the network node or by the wireless device, that are associated with a subset of a plurality of hybrid ARQ (HARQ) processes. The indicated parameter configuration can be one of a plurality of parameter configurations corresponding to a respective plurality of different subsets of the HARQ processes. The different subsets can include a first subset of one or more HARQ processes for which HARQ feedback is disabled, and a second subset of one or more HARQ processes for which HARQ feedback is enabled.

In some embodiments, the wireless device can also transmit or receive (e.g., in block 210) the data transmissions, associated with the subset of the HARQ processes, according to the indicated parameter configuration.

In some embodiments, the indicated parameter configuration is for a single HARQ process or for all HARQ processes of a single type. In other embodiments, the indicated parameter configuration is for all HARQ processes for which HARQ feedback is enabled, or for all HARQ processes for which HARQ feedback is disabled.

In some embodiments, the parameter configuration corresponding to the first subset can differ from the parameter configuration corresponding to the second subset in one or more of the following parameters:

aggregation factor indicating a number of consecutive slots scheduled by downlink control information;
transmission waveform type;
modulation and coding scheme table;
time domain resource allocation table;
type of frequency resource allocation;
block error rate target;
physical resource block bundling configuration;
type of physical downlink shared channel mapping; or
physical uplink shared channel transmission scheme.

FIG. 2B depicts another exemplary method for a wireless device in accordance with other exemplary embodiments. This method may include transmitting or receiving transmissions for different subsets of one or more error control processes according to different parameter configurations (Block 230). This method may alternatively or additionally include receiving, from a network node 12, control signaling 26 that indicates different parameter configurations according to which transmissions for different subsets of one or more error control processes are to be performed (Block 220).

FIG. 2C depicts another exemplary method for a wireless device in accordance with other exemplary embodiments. In the exemplary method shown in FIG. 2C, the wireless device can transmit (e.g., in block 250), to a network node in a wireless network, hybrid ARQ (HARQ) feedback for a set of downlink (DL) transmissions by the network node. The HARQ feedback can be based on a HARQ feedback codebook that includes:

a first entry, corresponding to a first HARQ process for which HARQ feedback is disabled, that indicates that HARQ feedback for a DL transmission is encoded as a negative acknowledgement; and a second entry, corresponding to a second HARQ process for which HARQ feedback is enabled, that indicates that HARQ feedback for a DL transmission is encoded based on a decoding outcome of the DL transmission.

In some embodiments, the HARQ feedback codebook can be a Type-1 HARQ-ACK codebook, as described elsewhere herein.

In some embodiments, the exemplary method can also include the operations of blocks 235-240. In block 235, the wireless device can receive, from the network node via a physical DL control channel (PDCCH), a set of downlink control information (DCI) that indicates respective schedules for the set of DL transmissions. In block 240, the wireless device can receive, from the network node via a physical DL shared channel (PDSCH), the set of DL transmissions according to the respective schedules.

In some of these embodiments, a position of the first entry in the HARQ feedback codebook can be based on a slot timing offset included in a DCI that schedules a DL transmission associated with the first HARQ process. Likewise, a position of the second entry in the HARQ feedback codebook can be based on a slot timing offset included in a DCI that schedules a DL transmission associated with the second HARQ process.

FIG. 2D depicts another exemplary method for a wireless device in accordance with other exemplary embodiments. The method includes receiving a downlink control information message that schedules a downlink transmission for a certain error control process and that includes a set of one or more fields whose interpretation depends on whether error control feedback is enabled or disabled for the certain error control process (Block 260). In some embodiments, the method also includes interpreting the set of one or more fields depending on whether error control feedback is enabled or disabled for the certain error control process (Block 270). The method may further includes receiving the downlink transmission in accordance with the received downlink control information message (Block 280).

In some embodiments, the one or more fields in the set include one or more of: a downlink assignment indicator field, a redundancy version field, a feedback timing field, or a physical uplink control channel resource indicator field. In some embodiments, a downlink assignment indicator field indicates the size of the type 2 HARQ codebook. In some embodiments, the redundancy version field indicates the redundancy version of the transport block being transmitted to the wireless device. In case feedback is enabled for an error control process, the wireless device can receive the same transport block with different redundancy versions which the wireless device can soft combine to improve reliability of transmissions received via a physical downlink shared channel (PDSCH). In some embodiments, the feedback timing field indicates the time offset from the time in which PDSCH is received corresponding to a certain error control process to the time in which feedback corresponding to the certain error control process is sent. In some embodiments, the physical uplink control channel resource indicator field indicates which resource among multiple resources is to be used for feedback corresponding to an error control process in the physical uplink control channel.

In some embodiments, when the error control feedback is disabled, the set of one or more fields indicates an aggregation factor indicating a number of consecutive downlink slots associated with the scheduled downlink transmission.

Alternatively or additionally, in some embodiments, when the error control feedback is disabled, the set of one or more fields, in combination with an error control process number field in the downlink control information message, indicates an error control process number that identifies the certain error control process.

FIG. 3A depicts an exemplary method for a network node in a wireless network, in accordance with other exemplary embodiments. In the exemplary method shown in FIG. 3A, the network node can transmit (e.g., in block 300), to a wireless device, control signaling that indicates a parameter configuration (e.g., 28 shown in FIG. 1) for data transmissions, by the network node or by the wireless device, that are associated with a subset of a plurality of hybrid ARQ (HARQ) processes. The indicated parameter configuration can be one of a plurality of parameter configurations corresponding to a respective plurality of different subsets of the HARQ processes. The different subsets can include a first subset of one or more HARQ processes for which HARQ feedback is disabled, and a second subset of one or more HARQ processes for which HARQ feedback is enabled.

In some embodiments, the network node can also transmit or receive (e.g., in block 310) the data transmissions, associated with the subset of the HARQ processes, according to the indicated parameter configuration.

In some embodiments, the indicated parameter configuration is for a single HARQ process or for all HARQ processes of a single type. In other embodiments, the indicated parameter configuration is for all HARQ processes for which HARQ feedback is enabled, or for all HARQ processes for which HARQ feedback is disabled.

In some embodiments, the parameter configuration corresponding to the first subset can differ from the parameter configuration corresponding to the second subset in one or more of the following parameters:
  aggregation factor indicating a number of consecutive slots scheduled by downlink control information;
  transmission waveform type;
  modulation and coding scheme table;
  time domain resource allocation table;
  type of frequency resource allocation;
  block error rate target;
  physical resource block bundling configuration;
  type of physical downlink shared channel mapping; or
  physical uplink shared channel transmission scheme.

FIG. 3B depicts another exemplary method for a network node in accordance with other exemplary embodiments. This method in some embodiments includes transmitting or receiving transmissions for different subsets of one or more error control processes according to different parameter configurations (Block 330). This method may alternatively or additionally include transmitting, from the network node 12 to the wireless device, control signaling 26 that indicates different parameter configurations according to which transmissions for different subsets of one or more error control processes are to be performed (Block 320).

FIG. 3C depicts another exemplary method for a network node in accordance with other exemplary embodiments. In the exemplary method shown in FIG. 3C, the network node can receive (e.g., in block 350), from a wireless device, hybrid ARQ (HARQ) feedback for a set of downlink (DL) transmissions by the network node. The HARQ feedback can be based on a HARQ feedback codebook that includes:
  a first entry, corresponding to a first HARQ process for which HARQ feedback is disabled, that indicates that HARQ feedback for a DL transmission is encoded as a negative acknowledgement; and
  a second entry, corresponding to a second HARQ process for which HARQ feedback is enabled, that indicates that HARQ feedback for a DL transmission is encoded based on a decoding outcome of the DL transmission.

In some embodiments, the HARQ feedback codebook can be a Type-1 HARQ-ACK codebook, as described elsewhere herein.

In some embodiments, the exemplary method can also include the operations of blocks 335-340. In block 335, the network node can transmit, to the wireless device via a physical DL control channel (PDCCH), a set of downlink control information (DCI) that indicates respective schedules for the set of DL transmissions. In block 340, the network node can transmit, to the wireless device via a physical DL shared channel (PDSCH), the set of DL transmissions according to the respective schedules.

In some of these embodiments, a position of the first entry in the HARQ feedback codebook can be based on a slot timing offset included in a DCI that schedules a DL transmission associated with the first HARQ process. Likewise, a position of the second entry in the HARQ feedback codebook can be based on a slot timing offset included in a DCI that schedules a DL transmission associated with the second HARQ process.

FIG. 3D depicts another exemplary method for a network node in accordance with other exemplary embodiments. This method includes transmitting, to a wireless device, a downlink control information message that schedules a downlink transmission for a certain error control process and that includes a set of one or more fields whose interpretation depends on whether error control feedback is enabled or disabled for the certain error control process (Block 370). In some embodiments, this method can also include encoding the set of one or more fields depending on whether error control feedback is enabled or disabled for the certain error control process (Block 360). This method may alternatively or additionally include transmitting the downlink transmission in accordance with the transmitted downlink control information message (Block 380).

In some embodiments, the one or more fields in the set include one or more of: a downlink assignment indicator field, a redundancy version field, a feedback timing field, or a physical uplink control channel resource indicator field. In some embodiments, a downlink assignment indicator field indicates the size of the type 2 HARQ codebook. In some embodiments, the redundancy version field indicates the redundancy version of the transport block being transmitted to the wireless device. In case feedback is enabled for an error control process, the wireless device can receive the same transport block with different redundancy versions which the wireless device can soft combine to improve reliability of PDSCH. In some embodiments, the feedback timing field indicates the time offset from the time in which PDSCH is received corresponding to a certain error control process to the time in which feedback corresponding to the certain error control process is sent. In some embodiments, the physical uplink control channel resource indicator field indicates which resource among multiple resources is to be used for feedback corresponding to an error control process in the physical uplink control channel.

In some embodiments, when the error control feedback is disabled, the set of one or more fields indicates an aggregation factor indicating a number of consecutive downlink slots associated with the scheduled downlink transmission.

Alternatively or additionally, in some embodiments, when the error control feedback is disabled, the set of one or more fields, in combination with an error control process number field in the downlink control information message, indicates an error control process number that identifies the certain error control process.

Embodiments herein also include corresponding apparatus, computer-readable media, and computer program products. Examples of such embodiments include wireless devices arranged to communicate with a network node in a wireless network via data transmissions and HARQ feedback associated with a plurality of HARQ processes, where the wireless device is further arranged to perform operations corresponding to any of the exemplary methods described above in relation to FIGS. 2A-2D.

Other examples include wireless devices comprising communication circuitry configured to communicate with a network node in a wireless network and processing circuitry operably coupled to the communication circuitry, whereby the processing circuitry and the communication circuitry are configured to perform operations corresponding to any of the exemplary methods described above in relation to FIGS. 2A-2D.

Other examples include non-transitory, computer-readable media storing computer-executable instructions that, when executed by processing circuitry of a wireless device, configure the wireless device to perform operations corresponding to any of the exemplary methods described above in relation to FIGS. 2A-2D.

Other examples include computer program products comprising computer-executable instructions that, when executed by processing circuitry of a wireless device, configure the wireless device to perform operations corresponding to any of the exemplary methods described above in relation to FIGS. 2A-2D.

Other examples include network nodes, in a wireless network, arranged to communicate with one or more wireless devices via data transmissions and HARQ feedback associated with a plurality of HARQ processes, where the network node being further arranged to perform operations corresponding to any of the exemplary methods described above in relation to FIGS. 3A-3D.

Other examples include network nodes comprising communication circuitry configured to communicate with a wireless device in a wireless network and processing circuitry operably coupled to the communication circuitry, whereby the processing circuitry and the communication circuitry are configured to perform operations corresponding to any of the exemplary methods described above in relation to FIGS. 3A-3D.

Other examples include non-transitory, computer-readable media storing computer-executable instructions that, when executed by processing circuitry of a network node in a wireless network, configure the network node to perform operations corresponding to any of the exemplary methods described above in relation to FIGS. 3A-3D.

Other examples include computer program products comprising computer-executable instructions that, when executed by processing circuitry of a network node in a wireless network, configure the network node to perform operations corresponding to any of the exemplary methods described above in relation to FIGS. 3A-3D.

Embodiments also include a wireless device comprising processing circuitry and power supply circuitry. The processing circuitry is configured to perform any of the steps of any of the embodiments described above for the wireless device. The power supply circuitry is configured to supply power to the wireless device.

Embodiments further include a wireless device comprising processing circuitry. The processing circuitry is configured to perform any of the steps of any of the embodiments described above for the wireless device. In some embodiments, the wireless device further comprises communication circuitry.

Embodiments further include a wireless device comprising processing circuitry and memory. The memory contains instructions executable by the processing circuitry whereby the wireless device is configured to perform any of the steps of any of the embodiments described above for the wireless device.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node configured to perform any of the steps of any of the embodiments described above for the radio network node.

Embodiments also include a radio network node comprising processing circuitry and power supply circuitry. The processing circuitry is configured to perform any of the steps of any of the embodiments described above for the radio network node. The power supply circuitry is configured to supply power to the radio network node.

Embodiments further include a radio network node comprising processing circuitry. The processing circuitry is configured to perform any of the steps of any of the embodiments described above for the radio network node. In some embodiments, the radio network node further comprises communication circuitry.

Embodiments further include a radio network node comprising processing circuitry and memory. The memory contains instructions executable by the processing circuitry whereby the radio network node is configured to perform any of the steps of any of the embodiments described above for the radio network node.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 4:
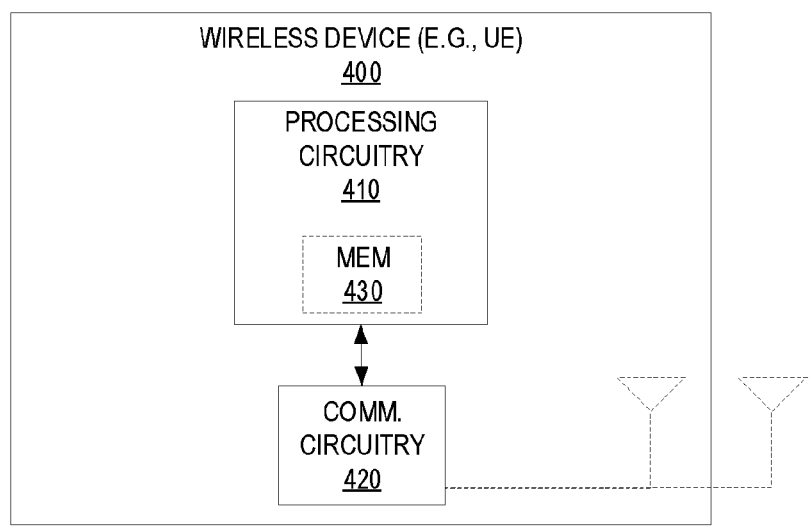
FIG. 4 illustrates an exemplary wireless device according to some embodiments.

FIG. 4 illustrates an exemplary wireless device 400 (e.g., wireless device 18) in accordance with one or more embodiments. As shown, the wireless device 400 includes processing circuitry 410 and communication circuitry 420. The communication circuitry 420 (e.g., radio circuitry) is configured to transmit and/or receive information to and/or from one or more other nodes, e.g., via any communication technology. Such communication may occur via one or more antennas that are either internal or external to the wireless device 400. The processing circuitry 410 is configured to perform processing described above, e.g., in FIGS. 2A, 2B, 2C, and/or 2D, such as by executing instructions stored in memory 430. The processing circuitry 410 in this regard may implement certain functional means, units, or modules.

Figure 5:
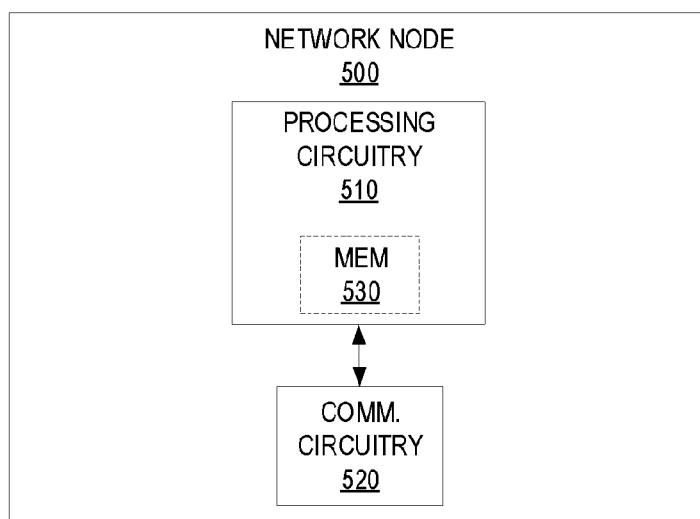
FIG. 5 illustrates an exemplary network node according to some embodiments.

FIG. 5 illustrates an exemplary network node 500 (e.g., network node 12) in accordance with one or more embodiments. As shown, the network node 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, e.g., in FIGS. 3A, 3B, 3C, and/or 3D, such as by executing instructions stored in memory 530. The processing circuitry 510 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described, e.g., with respect to HARQ processes in a NTN. At least some of these embodiments may be described as applicable in certain contexts and/or wireless network types for illustrative purposes, but the embodiments are similarly applicable in other contexts and/or wireless network types not explicitly described.

In 3GPP Release 8, the Evolved Packet System (EPS) was specified. EPS is based on the Long-Term Evolution (LTE) radio network and the Evolved Packet Core (EPC). It was originally intended to provide voice and mobile broadband (MBB) services but has continuously evolved to broaden its functionality. Since Release 13, Narrowband Internet of Things (NB-IoT) and LTE for machines (LTE-M) are part of the LTE specifications and provide connectivity to massive machine type communications (mMTC) services.

In 3GPP Release 15, the first release of the 5G system (5GS) was developed. This is a new generation radio access technology intended to serve use cases such as enhanced mobile broadband (eMBB), ultra-reliable and low latency communication (URLLC) and mMTC. 5G includes the New Radio (NR) access stratum interface and the 5G Core Network (5GC). The NR physical and higher layers are reusing parts of the LTE specification, and to that add needed components when motivated by the new use cases.

In Release 15, 3GPP started the work to prepare NR for operation in a Non-Terrestrial Network (NTN). The work was performed within the study item "NR to support Non-Terrestrial Networks" and resulted in TR 38.811. In Release 16, the work to prepare NR for operation in an NTN network continues with the study item RP-181370 "Solutions for NR to support Non-Terrestrial Network".

A satellite radio access network usually includes the following components: (i) a satellite that refers to a space-borne platform; (ii) an earth-based gateway that connects the satellite to a base station or a core network, depending on the choice of architecture; (iii) a feeder link that refers to the link between a gateway and a satellite; and (iv) a service link that refers to the link between a satellite and a UE.

Two popular architectures are the Bent pipe transponder and the Regenerative transponder architectures. In the first case, the base station is located on earth behind the gateway, and the satellite operates as a repeater forwarding the feeder link signal to the service link, and vice versa. In the second case, the satellite is in the base station and the service link connects it to the earth-based core network.

Depending on the orbit altitude, a satellite may be categorized as low earth orbit (LEO), medium earth orbit (MEO), or geostationary earth orbit (GEO) satellite. LEO has typical heights ranging from 250-1,500 km, with orbital periods ranging from 90-120 minutes. MEO has typical heights ranging from 5,000-25,000 km, with orbital periods ranging from 3-15 hours. And GEO has a height at about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spotbeam. The spotbeam may move over the earth surface with the satellite movement or may be earth fixed with some beam pointing mechanism used by the satellite to compensate for its motion. The size of a spotbeam depends on the system design, which may range from tens of kilometers to a few thousands of kilometers.

Figure 6:
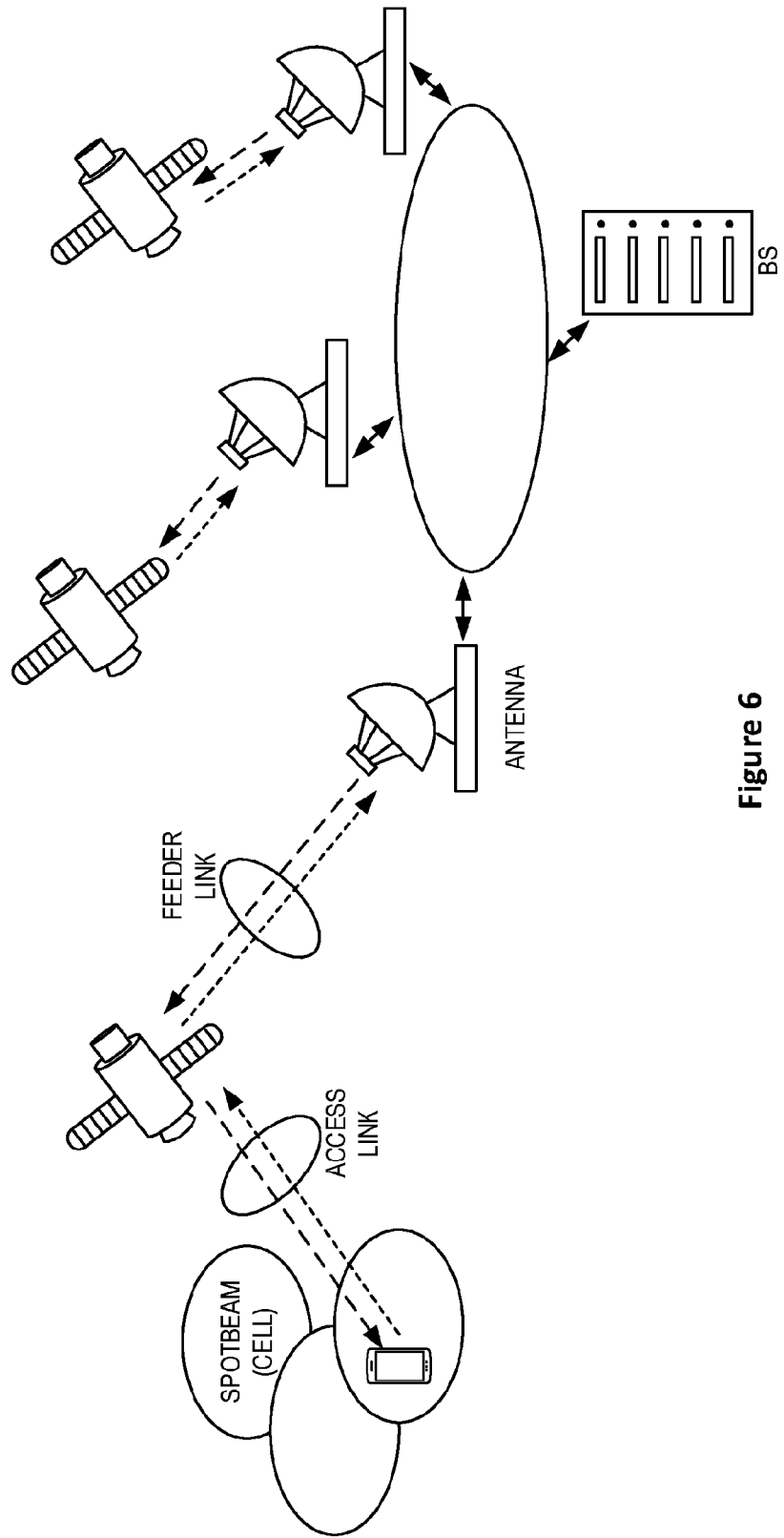
FIG. 6 shows an exemplary architecture of a satellite (or non-terrestrial) network with bent pipe transponders.

FIG. 6 shows an exemplary architecture of a satellite (or non-terrestrial) network with bent pipe transponders. The two main physical phenomena that affect satellite communications system design are the long propagation delay and Doppler effects.

The Doppler effects are especially pronounced for LEO satellites.

Propagation delay is a main physical phenomenon in a satellite communication system that makes the design different from that of a terrestrial mobile system. For a bent pipe satellite network, the following delays are relevant.

One-way delay: from the base station (BS) to the UE via the satellite, or the other way around Round-trip delay: from the BS to the UE via the satellite and from the UE back to the BS via the satellite Differential delay: the delay difference of two selected points in the same spotbeam Note that there may be additional delay between the ground BS antenna and BS, which may or may not be collocated. This delay depends on deployment. If the delay cannot be ignored, it should be taken into account in the communications system design.

The propagation delay depends on the length of the signal path, which further depends on the elevation angles of the satellite seen by the BS and UE on the ground. The minimum elevation angle is typically more than 10° for UE and more than 5° for BS on the ground.

The Hybrid automatic repeat request (HARQ) protocol is one of the most important features in NR/LTE. Together with link adaptation through channel state information (CSI) feedback and HARQ ACK/NACK, HARQ enables efficient, reliable and low delay data transmission in NR/LTE.

Existing HARQ procedures at the PHY/MAC layer have been designed for terrestrial networks where the round-trip time (RTT) propagation delay is restricted to within 1 ms. With the HARQ protocol, a transmitter needs to wait for the feedback from the receiver before sending new data. In case of a negative acknowledgement (NACK), the transmitter may need to resend the data packet. Otherwise, it may send new data. This stop-and-wait (SAW) procedure introduces inherent latency to the communication protocol, which may reduce the link throughput. To alleviate this issue, the existing HARQ procedure allows activating multiple HARQ processes at the transmitter. That is, the transmitter may initiate multiple transmissions in parallel without having to wait for a HARQ completion. For example, with 16 (8) HARQ processes in NR (LTE) DL, the gNB (eNB) may initiate up to 16 (8) new data transmissions without waiting for an ACK for the first packet transmission. Note that there are a sufficient number of HARQ processes for terrestrial networks where the propagation delay is typically less than 1 ms.

Figure 7:
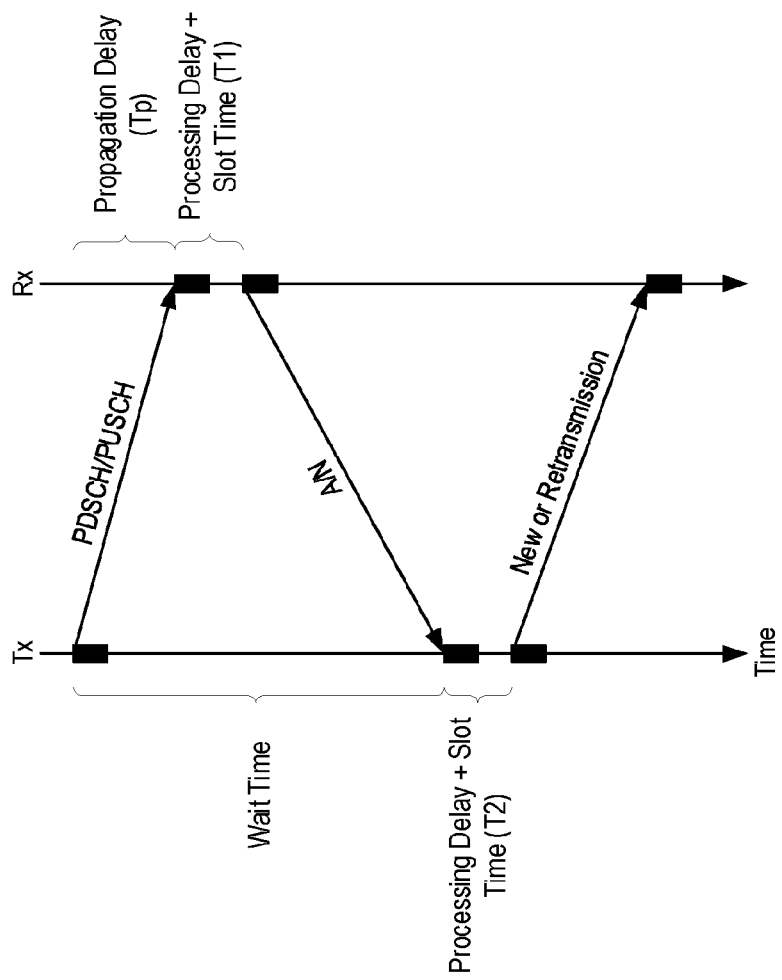
FIG. 7 shows various delays associated with a hybrid ARQ (HARQ) procedure.

FIG. 7 shows the various delays associated with the HARQ procedure:

1. The packet first reaches the receiver after a propagation delay Tp.
2. The receiver sends the feedback after a processing/slot delay T1.
3. The feedback reaches the data transmitter after a propagation delay Tp.
4. The transmitter may send a retransmission or new data after a processing/slot delay T2.
5. To avoid HARQ stalling, the minimum required number of HARQ processes is ceil((2Tp+T1+T2)/Ts) where Ts refers to the slot duration in NR and the subframe duration in LTE.

Existing HARQ procedures in LTE/NR have largely been designed for terrestrial networks where the propagation delay is typically limited to 1 ms. Issues exist, though, with using the existing HARQ protocol amid large propagation delays.

More particularly, the existing HARQ mechanism may not be feasible when the propagation delay is much larger than that supported by the allowed number of HARQ processes. For example, consider the scenario where LTE DL is to be adopted for satellite communications. For the GEO case, the RTT propagation delay can be around 500 ms. With 8 HARQ processes, the eNB needs to wait for around 500 ms before sending new data. This translates to benefitting from only a meager fraction (8/500) of the available peak throughput. Even with 16 HARQ processes supported in NR and with 1 ms slot duration, the available peak throughput as a percentage of the total channel capacity is very low. Table 1 summarizes the available peak throughput for a UE for LEO, MEO and GEO satellites. Therefore, without a sufficient number of HARQ processes, the sheer magnitude of the propagation delay may render closed-loop HARQ communication impractical.

The number of HARQ processes supported by the existing HARQ protocol is not sufficient to absorb the potentially large propagation delays in non-terrestrial networks. For example, Table 1 shows that a substantial increase in the existing number of HARQ processes is required for operating HARQ amid large propagation delays. Unfortunately, it is challenging to support that many HARQ processes (especially at the UE) due to the following reasons: (i) It requires large memory at both the transmitter and receiver; (ii) It may require reducing the HARQ buffer size (and thus the maximum supported transport block size, TBS); (iii) A large number of HARQ buffers implies a large number of HARQ receivers; (iv) It may increase the signaling overhead for HARQ ID. Indeed, in NR, the HARQ process ID is indicated in the downlink control information (DCI) and currently there are 4 bits in the HARQ process number field to indicate this. Increasing the number of HARQ processes to 500 would require around 9 bits (more than double the current 4 bits in the HARQ process number field).

TABLE 1

Required number of HARQ processes in satellite networks. The peak throughput with 16 HARQ processes and Ts = 1 ms is also listed.

| Satellite | Total delay | Reqd. # HARQ processes | Available peak throughput (% of peak capacity) |
|---|---|---|---|
| LEO | ~50 ms | ~50 | ~32% |
| MEO | ~180 ms | ~180 | ~8.9% |
| GEO | ~600 ms | ~600 | ~2.7% |

Note that Rel-15 NR supports a maximum of 16 HARQ processes in UL/DL. LTE typically supports 8 processes in UL/DL.

In short, the existing (PHY/MAC) HARQ mechanism is ill-suited to non-terrestrial networks with large propagation delays. Moreover, there is no existing signaling mechanism for disabling HARQ at the PHY/MAC layers.

One solution is to make the use of HARQ configurable by the network [3]. In other words, the network should be able to configure the UE to turn off HARQ. There is no feedback for transmission if HARQ is turned off.

Consider now NR HARQ ACK/NACK feedback over PUCCH. In NR, when receiving a Physical Downlink Shared Channel (PDSCH) in the downlink from a serving gNB at slot n, a UE feeds back a HARQ ACK at slot n+k over a PUCCH (Physical Uplink Control Channel) resource in the uplink to the gNB if the PDSCH is decoded successfully. Otherwise, the UE sends a HARQ NACK at slot n+k to the gNB to indicate that the PDSCH is not decoded successfully. If two Transport Blocks (TBs) are carried by the PDSCH, then a HARQ ACK/NACK is reported for each TB so that if one TB is not decoded successfully, only that TB needs to be retransmitted by the gNB. Spatial bundling can be configured, in which case the logical AND of the decoding states of TB1 and TB2 is fed back to the gNB.

For DCI format 1-0, k is indicated by a 3-bit PDSCH-to-HARQ-timing-indicator field. For DCI format 1-1, k is indicated either by a 3-bit PDSCH-to-HARQ-timing-indicator field, if present, or by higher layer through Radio Resource Control (RRC) signaling.

If code block group (CBG) transmission is configured, a HARQ ACK/NACK for each CBG in a TB is reported instead.

In case of carrier aggregation (CA) with multiple carriers and/or TDD operation, multiple aggregated HARQ ACK/NACK bits need to be sent in a single PUCCH.

In NR, up to four PUCCH resource sets can be configured to a UE. A PUCCH resource set with pucch-ResourceSetId=0 can have up to 32 PUCCH resources while for PUCCH resource sets with pucch-ResourceSetId=1 to 3, each set can have up to 8 PUCCH resources. A UE determines the PUCCH resource set in a slot based on the number of aggregated UCI (Uplink Control Information) bits to be sent in the slot. The UCI bits consists of HARQ ACK/NACK, scheduling request (SR), and channel state information (CSI) bits.

If the UE transmits $O_{UCI}$ UCI information bits, the UE determines a PUCCH resource set to be
- a first set of PUCCH resources with pucch-ResourceSetId=0 if $O_{UCI} \leq 2$ including 1 or 2 HARQ-ACK information bits and a positive or negative SR on one SR transmission occasion if transmission of HARQ-ACK information and SR occurs simultaneously, or
- a second set of PUCCH resources with pucch-ResourceSetId=1, if provided by higher layers, if $2 < O_{UCI} \leq N_2$, or
- a third set of PUCCH resources with pucch-ResourceSetId=2, if provided by higher layers, if $N_2 < O_{UCI} \leq N_3$, or
- a fourth set of PUCCH resources with pucch-ResourceSetId=3, if provided by higher layers, if $N_3 \leq O_{UCI} \leq 1706$ where $N_1 < N_2 < N_3$ are provided by higher layers.

For a PUCCH transmission with HARQ-ACK information, a UE determines a PUCCH resource after determining a PUCCH resource set. The PUCCH resource determination is based on a 3-bit PUCCH resource indicator (PRI) field in DCI format 1_0 or DCI format 1_1.

If more than one DCI format 1_0 or 1_1 are received in the case of CA and/or TDD, the PUCCH resource determination is based on a PUCCH resource indicator (PRI) field in the last DCI format 1_0 or DCI format 1_1 among the multiple received DCI format 1_0 or DCI format 1_1 that the UE detects.

NR Rel-15 supports two types of HARQ codebooks, i.e., semi-static (type 1) and dynamic (type 2) codebooks, for HARQ Ack/Nack multiplexing for multiple PDSCHs of one or more component carriers (CCs). A UE can be configured to use either one of the codebooks for HARQ Ack/Nack feedback.

Consider now NR Type-1 HARQ-ACK codebook determination. HARQ codebook (CB) size in time (DL association set) is determined based on the configured set of HARQ-ACK timings K1, and semi-static configured TDD pattern in case of TDD. For a PDCCH received in slot n for a PDSCH, K1 is signaled in the PDCCH and indicates that the HARQ A/N feedback for the PDSCH occurs in slot n+K1.

Figure 8:
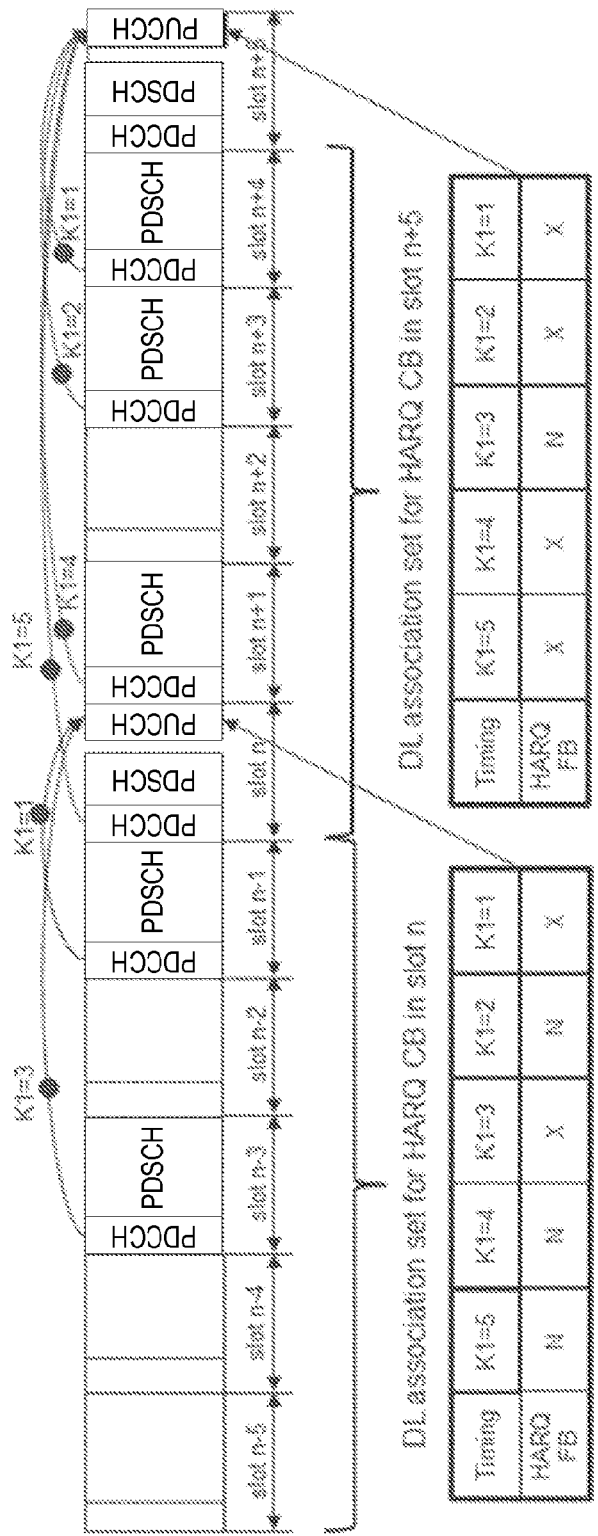
FIG. 8 shows an exemplary time-division duplexing (TDD) pattern of downlink (DL) data transmissions and corresponding HARQ uplink (UL) transmissions based on a codebook, according to some embodiments.

An example is shown in FIG. 8 for a TDD pattern with a set of K1 from 1 to 5 and a configured time-domain resource allocation table or the pdsch-TimeDomainAllocationList without non-overlapping PDSCH TDRA allocation, i.e., only one PDSCH can be scheduled in a slot. In this case, there are 5 entries in the HARQ codebook, one for each K1 value. For slots without PDSCH transmission or for slots where there is no PDSCH detected, the corresponding entry in the codebook is filled with NACK.

If a UE supports reception of more than one unicast PDSCH per slot, one HARQ codebook entry for each non-overlapping time-domain resource allocation in the pdsch-symbolAllocation table is reserved per slot; otherwise one HARQ entry is reserved per slot.

Consider now NR Type-2 HARQ-ACK codebook determination. Unlike Type 1 HARQ codebook, the size of type 2 HARQ codebook changes dynamically based on the number of Das scheduling PDSCH receptions or SPS PDSCH release that are associated with a same PUCCH resource for HARQ Ack/NACK feedback. The number of Das can be derived based a counter DAI (Downlink Assignment Indicator) field in the Das and in case of DCI format 1-1, also a total DAI field if more than one serving cell are configured.

A value of the counter DAI field in DCI format 1_0 or DCI format 1_1 denotes the accumulative number of {serving cell, PDCCH monitoring occasion}-pair(s) in which PDSCH reception(s) or SPS PDSCH release associated with DCI format 1_0 or DCI format 1_1 is present, up to the current serving cell and current PDCCH monitoring occasion.

The value of the total DAI, when present, in DCI format 1_1 denotes the total number of {serving cell, PDCCH monitoring occasion}-pair(s) in which PDSCH reception(s) or SPS PDSCH release associated with DCI format 1_0 or DCI format 1_1 is present, up to the current PDCCH monitoring occasion $^m$ and is updated from PDCCH monitoring occasion to PDCCH monitoring occasion.

An example is shown FIG. 9, where a UE is configured with 2 serving cells and 3 PDCCH monitoring occasions. The corresponding counter DAI and total DAI values after each scheduled DCI are shown. The counter DAI is updated after every scheduled DCI while total DAI is only updated every monitoring occasion. Since only 2 bits are allocated for either counter DAI or total DAI in DCI, the actual DAI values are wrapped round with a modulo 4 operation. A UE can figure out the actual number of DCIs transmitted even though some DCIs are undetected, if the undetected consecutive DCIs are smaller than 4.

For DCI format 1-1, the DAI field is only present when the Type-2 HARQ-ACK is used and bit-widths of 0, 2, or 4 bits are possible. For DCI format 1-0, the DAI field is composed for 2 bits.

There currently exist certain challenge(s). The large delay in NTN scenarios may be addressed using HARQ deactivation. But, without the HARQ mechanism at the PHY/MAC layer, the transmission reliability will reduce considerably. In the event of a packet loss, the receiver will rely on higher layer (e.g., RLC) retransmission and error control protocols to recover lost packets. This, however, may incur additional latency due to large propagation delays (i.e., for the very same reason HARQ was deemed unsuitable and deactivated in the first place).

Certain aspects of the present disclosure and their embodiments may provide solutions to these or other challenges. Some embodiments herein include methods for improving transmission reliability (e.g., at the PHY/MAC layer) for the case when HARQ feedback/retransmission protocol/mechanism is disabled for some HARQ processes and enabled for the rest of the HARQ processes.

More particularly, HARQ protocol/mechanism as used herein refers to HARQ procedure at the PHY/MAC layer. The term "Feedback-less HARQ process" as used herein refers to a HARQ process for which HARQ feedback is disabled. A Feedback-less HARQ process is an example of an error control process 20-1 . . . 20-N in FIG. 1 for which feedback is disabled. With HARQ feedback disabled, retransmissions may effectively be disabled for such a HARQ process. Similarly, the term "Feedback-based HARQ process" as used herein refers to a HARQ process for which HARQ feedback is enabled. With HARQ feedback enabled, retransmissions may effectively be enabled for such a HARQ process. A Feedback-based HARQ process is an example of an error control process 20-1 . . . 20-N in FIG. 1 for which feedback is enabled. In this context, some embodiments herein use different transmission configurations for Feedback-based and Feedback-less HARQ processes. With this approach, the PHY layer transmission can be made more reliable for Feedback-less HARQ processes without jeopardizing the performance of Feedback-based HARQ processes. This avoids unnecessarily invoking the higher layer retransmissions/error control protocols in a Feedback-less HARQ process, which may add further latency and reduce throughput due to large propagation delays in non-terrestrial networks.

Some embodiments generally adapt HARQ to non-terrestrial networks.

Some embodiments introduce methods to specify different parameter configurations for HARQ processes with HARQ feedback disabled and those with HARQ feedback enabled. This enables the network to configure (e.g., via control signaling 26 in FIG. 1) the parameters related to power control, modulation and coding scheme (MCS), waveform, etc. such that the transmission on the Feedback-less HARQ process becomes more reliable. By improving reliability of a Feedback-less HARQ process, some embodiments can help reduce the overall latency by avoiding the need to invoke higher layer error control/retransmission procedures when HARQ is disabled at the PHY/MAC layer. Moreover, this additional reliability can be obtained without disturbing the operation of Feedback-based HARQ processes. Some embodiments alternatively or additionally provide the necessary UE procedures for determining NR Type-1 HARQ codebook entries when the UE is configured with both 'Feedback-less HARQ processes' and 'Feedback-based HARQ processes.

Certain embodiments may provide one or more of the following technical advantage(s). Some embodiments introduce methods for configuring transmission parameters for HARQ processes differently given HARQ is enabled or disabled. Without this distinction, the same parameter configuration would apply to all HARQ processes regardless of whether HARQ mechanism is disabled. With the ability to signal different parameter configurations for different HARQ processes, there are several potential advantages: (i) It helps improve the transmission reliability for Feedback-less HARQ processes; (ii) A more reliable Feedback-less HARQ process means the error control procedure/retransmission is triggered sparingly, which may help reduce latency compared to the case where RLC retransmission is used excessively due to decoding errors at PHY/MAC layers; and/or (iii) It helps avoid performance degradation for feedback-based HARQ processes since the network need not change the parameter configuration for feedback-based HARQ processes to accommodate Feedback-less HARQ processes.

Some embodiments decouple transmission configurations for Feedback-based and Feedback-less HARQ processes. Heretofore, the transmission parameter configuration signaled by the gNB to a UE applies to all HARQ processes. By contrast, some embodiments herein decouple transmission parameter configuration for Feedback-less HARQ processes from the transmission parameter configuration for Feedback-based HARQ processes.

Consider an example where HARQ feedback is enabled for HARQ process ID 0 and disabled for the rest of the HARQ processes. Then, the gNB according to some embodiments herein can configure (e.g., via control signaling 26 in FIG. 1) two sets of transmission parameter configurations: one for the Feedback-based HARQ process with ID 0 and the other for Feedback-less HARQ processes. UE then applies the corresponding configuration to a HARQ process depending on if the HARQ process is a Feedback-based HARQ process or a Feedback-less HARQ process.

Some embodiments specifically concern power control configuration. One or more embodiments, for example, introduce new radio resource control (RRC) signaling to allow the gNB to set power control parameters independently for Feedback-less and Feedback-based HARQ processes.

In one example, the power control profile may be set more aggressively for HARQ processes with HARQ feedback disabled. For example, the target received power can be set to a higher value to encourage the UEs to transmit with a higher power when using a Feedback-less HARQ process. For a Feedback-based HARQ process, however, the normal power control configuration can be used.

The following are example power control parameters that may be set differently for Feedback-less HARQ processes and Feedback-based HARQ processes: (i) Nominal UE specific PO; (ii) Pathloss compensation factor alpha; (iii) deltaMCS; (iv) tpc-Accumulation; (v) twoPUSCH-PC-AdjustmentStates; and/or (vi) Mapping of TPC Command Field in DCI to absolute or accumulated closed loop power control value.

Other embodiments herein concern transmit power selection. One embodiment, for instance, introduces new signaling to allow the gNB to directly set the transmit power for Feedback-less HARQ processes. That is, rather than setting power control parameters differently for Feedback-less and Feedback-based HARQ processes, this embodiment allows the gNB to directly set the UE transmit power for a certain HARQ process.

Consider an example. Instead of relying on existing power control procedure, the gNB may directly set the transmit power for physical uplink shared channel (PUSCH) transmissions over a Feedback-less HARQ process. For example, it is possible that the power control procedure suggests a transmit power lower than the maximum transmit power. To increase the received SNR at the gNB, some embodiments allow the UE to bypass the power control procedure altogether and transmit with maximum power. With a higher signal-to-noise-ratio (SNR), the transmission is more likely to be decoded successfully.

In another embodiment, 1 bit is used to signal to the UE whether or not to transmit with maximum power.

In yet another embodiment, N bits can be reserved for this purpose if the gNB wants to select the transmit power level from a set with up to $2^N$ possible values. For example, with N=2 bits, the gNB may indicate four possibilities:

| Bit values | Meaning |
| --- | --- |
| 00 | Transmit with existing power |
| 01 | Transmit X dB lower than maximum power |
| 10 | Transmit Y dB lower than maximum power |
| 11 | Transmit with maximum power |

The values "X" and "Y" may be fixed in the 3GPP specification or configured in RRC signaling.

Generally, then, some embodiments introduce new signaling to allow the gNB to set different transmission configurations for Feedback-based and Feedback-less HARQ processes.

Consider another example. An aggregation factor greater than 1 can be configured and applied to Feedback-less HARQ processes to improve reliability, while Aggregation factor equal to 1 can be configured and applied to feedback-based HARQ processes. As another example, to improve the reliability, a more robust waveform can be configured for HARQ processes with HARQ feedback disabled. For example, DFT-S-OFDM waveform can be used for Feedback-less HARQ processes while CP-OFDM is used for Feedback-based HARQ processes.

Other example transmission parameters that may be set differently for Feedback-less HARQ processes and Feedback-based HARQ processes include one or more of: MCS table, Time domain resource allocation table, Frequency resource allocation type 0 and type 1, Block error rate target, Physical resource block (PRB) bundling configuration, PDSCH mapping type A and type B, and/or PUSCH transmission schemes (codebook based transmission and non-codebook based transmission).

Still other embodiments herein consider NR Type-1 HARQ-ACK codebook Impact. With the UE being configured with both 'Feedback-less HARQ processes' and 'Feedback-based HARQ processes', some embodiments define UE procedures on how to determine the entries in the NR Type-1 HARQ codebook. In one embodiment, the UE procedures for determining NR Type-1 HARQ codebook entries are defined when the UE is configured with both 'Feedback-less HARQ processes' and 'Feedback-based HARQ processes'. In one embodiment, the UE inserts NACKs in positions corresponding to PDSCHs associated with feedback-less HARQ process in a NR Type-1 HARQ-ACK codebook. For PDSCHs associated with feedback-based HARQ processes, the UE inserts ACK or NACK depending on decoding outcome of the PDSCHs.

Figure 10:
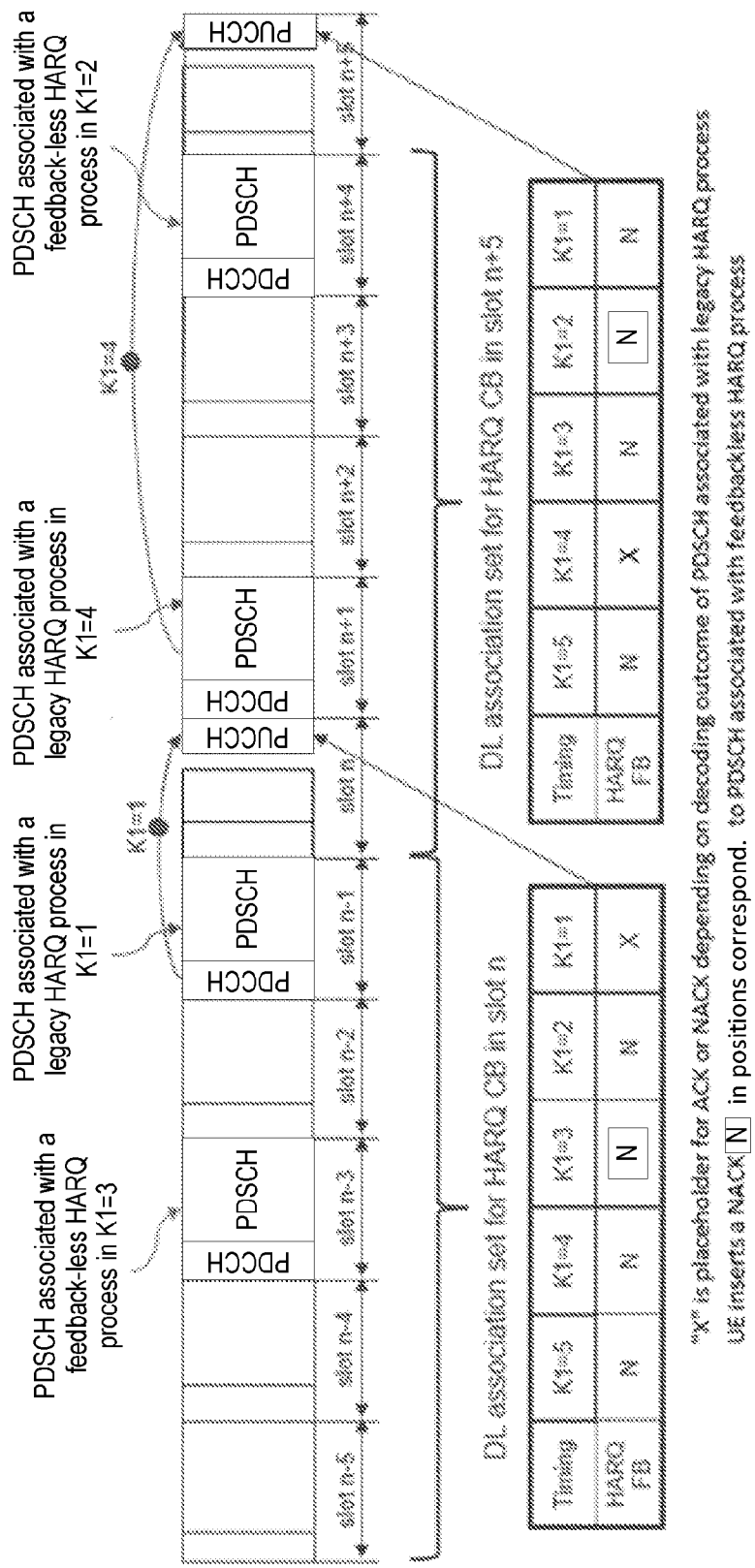
FIG. 10 shows another exemplary TDD pattern of DL data transmissions and corresponding HARQ UL transmissions based on a codebook, according to some embodiments.

FIG. 10 shows an example of Type 1 HARQ codebook with K1={1,2,3,4,5} and with NACKs inserted in positions corresponding to PDSCHs associated with feedback-less HARQ processes. In the DL association set for HARQ CB in slot n, the UE receives a PDSCH associated with a feedback-less HARQ process in slot n−3 (corresponding to K1=3) and a PDSCH associated with a feedback-based HARQ process in slot n−1 (corresponding to K1=1). As there is no ACK-NACK feedback for the PDSCH associated with feedback-less HARQ process, the UE will insert a NACK (N) in position K1=3 corresponding to the PDSCH received in slot n−3. For PDSCH received in slot n−1 which is associated with a feedback-based HARQ process, the UE inserts ACK-NACK bit X which depends on the outcome of the PDSCH associated with the feedback-based HARQ process.

Similarly, in the DL association set for HARQ CB in slot n+5, the UE inserts a NACK in position K1=2 which corresponds to a PDSCH associated with a feedback-less HARQ process. For PDSCH received in slot n+1 which is associated with a feedback-based HARQ process, the UE inserts ACK-NACK bit X which depends on the outcome of the PDSCH associated with the feedback-based HARQ process.

Still other embodiments herein concern efficient use of unused DCI fields. When a PDSCH corresponding to a Feedback-less HARQ process is scheduled by a DCI, one or more DCI fields may not be useful. For instance, since there is no ACK/NACK feedback for a PDSCH corresponding to a feedback-less HARQ process, DCI fields such as DAI, RV (redundancy version), PDSCH-to-HARQ feedback timing, and PRI are not useful. In one embodiment, one or a combination of these fields are usable to dynamically indicate other information related to PDSCH corresponding to a feedback-less HARQ process.

In one variant of this embodiment, a list of Aggregation factors can be configured to feedback-less HARQ processes and one of the Aggregation factor values can be indicated dynamically by one or a combination of DCI fields such as DAI, RV (redundancy version), PDSCH-to-HARQ feedback timing, and PRI. For instance, when the UE receives a PDSCH corresponding to feedback-less HARQ processes (as indicated by the HARQ process number field in DCI), then the UE interprets one or a combination of the DAI, RV, PDSCH-to-HARQ feedback timing, and PRI fields to infer the Aggregation factor value associated with the PDSCH. If the UE receives a PDSCH corresponding to feedback-based HARQ process, then the DAI, RV, PDSCH-to-HARQ feedback timing, and PRI fields are interpreted the legacy way as specified in NR Rel-15.

In this regard, note that different types of data traffic may have different reliability requirements. Hence, it is beneficial to dynamically indicate aggregation factor. For instance, a larger aggregation factor can be dynamically indicated for data requiring higher reliability, and a smaller aggregation factor can be dynamically indicated for data requiring lower reliability. This becomes important particularly when there is no HARQ Ack/Nack feedback.

Figure 11:
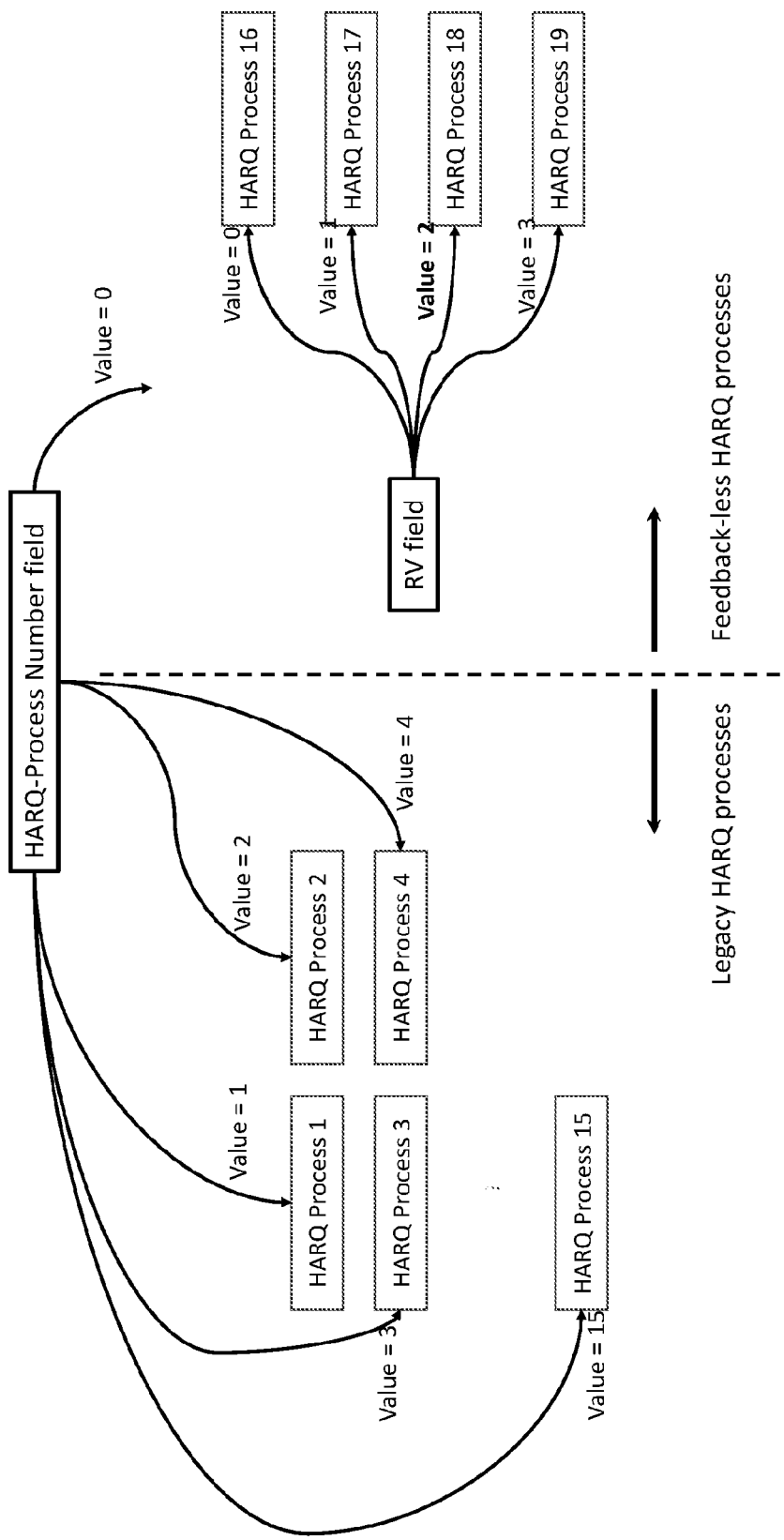
FIG. 11 shows an example where the combination of a HARQ process number field and a redundancy version (RV) field are used to identify a HARQ process number, according to some embodiments.

In another variant of this embodiment, one or more of the DCI fields such as DAI, RV, PDSCH-to-HARQ feedback timing, and PRI can be used along with the HARQ process number field to indicate the HARQ process number. This is useful in the case where the number of HARQ processes are increased in NTN scenarios to more than 16 processes in which case the 4 bits in the HARQ process number field in DCI is not sufficient. FIG. 11 shows an example where RV field and HARQ process number field being used to identify the HARQ process numbers when more than 16 HARQ processes are configured. In the example, there are 19 HARQ processes configured wherein 4 of them (processes 16-19) are feedback less HARQ processes while 15 of them (processes 1-15) are feedback-based HARQ processes. The feedback-based HARQ processes are indicated directly by the respective values indicated by the HARQ process number field. To indicate one of the feedback-less HARQ processes, the HARQ process number field indicates a particular value (value 0 in this example) and a value indicated by the RV field indicates one among the configured feedback-less HARQ processes. The example of FIG. 11 therefore shows the use of HARQ-Process number field in combination with one or more of the DAI, RV, PDSCH-to-HARQ feedback timing, and PRI fields to identify the HARQ process number.

Figure 12:
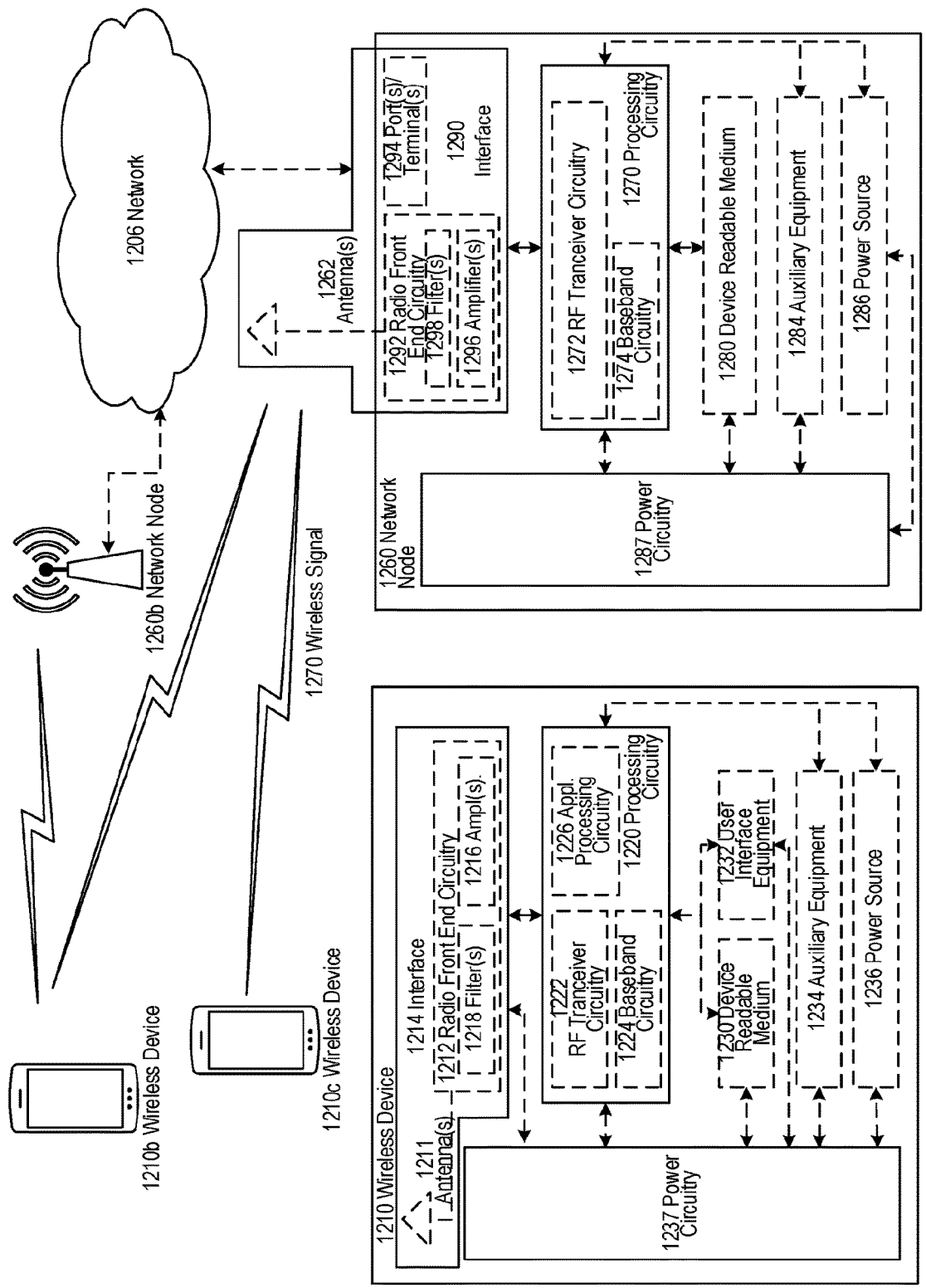
FIG. 12 is a block diagram of a wireless communication network according to some embodiments.

Although the subject matter described herein can be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260*b*, and WDs 1210, 1210*b*, and 1210*c*. In practice, a wireless network can further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1260 are depicted as single boxes located within a larger box, or nested within multiple boxes, in practice, a network node can comprise multiple different physical components that make up a single illustrated component (e.g., device readable medium 1280 can comprise multiple separate hard drives as well as multiple RAM modules).

Similarly, network node 1260 can be composed of multiple physically separate components (e.g., a NodeB component and an RNC component, or a BTS component and a BSC component, etc.), which can each have their own respective components. In certain scenarios in which network node 1260 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1260 can be configured to support multiple radio access technologies (RATs). In such embodiments, some components can be duplicated (e.g., separate device readable medium 1280 for the different RATs) and some components can be reused (e.g., the same antenna 1262 can be shared by the RATs). Network node 1260 can also include multiple sets of the various illustrated components for different wireless technologies integrated into network node 1260, such as, for example, GSM, WCDMA, LTE, NR, WiFi, or Bluetooth wireless technologies. These wireless technologies can be integrated into the same or different chip or set of chips and other components within network node 1260.

Processing circuitry 1270 can be configured to perform any determining, calculating, or similar operations (e.g., certain obtaining operations) described herein as being provided by a network node. These operations performed by processing circuitry 1270 can include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1260, either alone or in conjunction with other network node 1260 components (e.g., device readable medium 1280). Such functionality can include any of the various wireless features, functions, or benefits discussed herein.

For example, processing circuitry 1270 can execute instructions stored in device readable medium 1280 or in memory within processing circuitry 1270. In some embodiments, processing circuitry 1270 can include a system on a chip (SOC). As a more specific example, instructions (also referred to as a computer program product) stored in medium 1280 can include instructions that, when executed by processing circuitry 1270, can configure network node 1260 to perform operations corresponding to various exemplary methods (e.g., procedures) described herein.

In some embodiments, processing circuitry 1270 can include one or more of radio frequency (RF) transceiver circuitry 1272 and baseband processing circuitry 1274. In some embodiments, radio frequency (RF) transceiver circuitry 1272 and baseband processing circuitry 1274 can be on separate chips (or sets of chips), boards, or units, such as radio units and digital units. In alternative embodiments, part or all of RF transceiver circuitry 1272 and baseband processing circuitry 1274 can be on the same chip or set of chips, boards, or units In certain embodiments, some or all of the functionality described herein as being provided by a network node, base station, eNB or other such network device can be performed by processing circuitry 1270 executing instructions stored on device readable medium 1280 or memory within processing circuitry 1270. In alternative embodiments, some or all of the functionality can be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260 but are enjoyed by network node 1260 as a whole, and/or by end users and the wireless network generally.

Device readable medium 1280 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1270. Device readable medium 1280 can store any suitable instructions, data or information, including a computer program, software, an application including one or more of logic, rules, code, tables, etc. and/or other instructions capable of being executed by processing circuitry 1270 and, utilized by network node 1260. Device readable medium 1280 can be used to store any calculations made by processing circuitry 1270 and/or any data received via interface 1290. In some embodiments, processing circuitry 1270 and device readable medium 1280 can be considered to be integrated.

Interface 1290 is used in the wired or wireless communication of signaling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that can be coupled to, or in certain embodiments a part of, antenna 1262. Radio front end circuitry 1292 comprises filters 1298 and amplifiers 1296. Radio front end circuitry 1292 can be connected to antenna 1262 and processing circuitry 1270. Radio front end circuitry can be configured to condition signals communicated between antenna 1262 and processing circuitry 1270. Radio front end circuitry 1292 can receive digital data that is to be sent out to other network nodes or WDs via a wireless connection. Radio front end circuitry 1292 can convert the digital data into a radio signal having the appropriate channel and bandwidth parameters using a combination of filters 1298 and/or amplifiers 1296. The radio signal can then be transmitted via antenna 1262. Similarly, when receiving data, antenna 1262 can collect radio signals which are then converted into digital data by radio front end circuitry 1292. The digital data can be passed to processing circuitry 1270. In other embodiments, the interface can comprise different components and/or different combinations of components.

In certain alternative embodiments, network node 1260 may not include separate radio front end circuitry 1292, instead, processing circuitry 1270 can comprise radio front end circuitry and can be connected to antenna 1262 without separate radio front end circuitry 1292. Similarly, in some embodiments, all or some of RF transceiver circuitry 1272 can be considered a part of interface 1290. In still other embodiments, interface 1290 can include one or more ports or terminals 1294, radio front end circuitry 1292, and RF transceiver circuitry 1272, as part of a radio unit (not shown), and interface 1290 can communicate with baseband processing circuitry 1274, which is part of a digital unit (not shown).

Antenna 1262 can include one or more antennas, or antenna arrays, configured to send and/or receive wireless signals. Antenna 1262 can be coupled to radio front end circuitry 1290 and can be any type of antenna capable of transmitting and receiving data and/or signals wirelessly. In some embodiments, antenna 1262 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1262 can be separate from network node 1260 and can be connectable to network node 1260 through an interface or port.

Antenna 1262, interface 1290, and/or processing circuitry 1270 can be configured to perform any receiving operations and/or certain obtaining operations described herein as being performed by a network node. Any information, data and/or signals can be received from a wireless device, another network node and/or any other network equipment. Similarly, antenna 1262, interface 1290, and/or processing circuitry 1270 can be configured to perform any transmitting operations described herein as being performed by a network node. Any information, data and/or signals can be transmitted to a wireless device, another network node and/or any other network equipment.

Power circuitry 1287 can comprise, or be coupled to, power management circuitry and can be configured to supply the components of network node 1260 with power for performing the functionality described herein. Power circuitry 1287 can receive power from power source 1286. Power source 1286 and/or power circuitry 1287 can be configured to provide power to the various components of network node 1260 in a form suitable for the respective components (e.g., at a voltage and current level needed for each respective component). Power source 1286 can either be included in, or external to, power circuitry 1287 and/or network node 1260. For example, network node 1260 can be connectable to an external power source (e.g., an electricity outlet) via an input circuitry or interface such as an electrical cable, whereby the external power source supplies power to power circuitry 1287. As a further example, power source 1286 can comprise a source of power in the form of a battery or battery pack which is connected to, or integrated in, power circuitry 1287. The battery can provide backup power should the external power source fail. Other types of power sources, such as photovoltaic devices, can also be used.

Alternative embodiments of network node 1260 can include additional components beyond those shown in FIG. 12 that can be responsible for providing certain aspects of the network node's functionality, including any of the functionality described herein and/or any functionality necessary to support the subject matter described herein. For example, network node 1260 can include user interface equipment to allow and/or facilitate input of information into network node 1260 and to allow and/or facilitate output of information from network node 1260. This can allow and/or facilitate a user to perform diagnostic, maintenance, repair, and other administrative functions for network node 1260.

In some embodiments, a wireless device (WD, e.g., WD 1210) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 can include multiple sets of one or more of the illustrated components for different wireless technologies supported by WD 1210, such as, for example, GSM, WCDMA, LTE, NR, WiFi, WiMAX, or Bluetooth wireless technologies, just to mention a few. These wireless technologies can be integrated into the same or different chips or set of chips as other components within WD 1210.

Antenna 1211 can include one or more antennas or antenna arrays, configured to send and/or receive wireless signals, and is connected to interface 1214. In certain alternative embodiments, antenna 1211 can be separate from WD 1210 and be connectable to WD 1210 through an interface or port. Antenna 1211, interface 1214, and/or processing circuitry 1220 can be configured to perform any receiving or transmitting operations described herein as being performed by a WD. Any information, data and/or signals can be received from a network node and/or another WD. In some embodiments, radio front end circuitry and/or antenna 1211 can be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220 and can be configured to condition signals communicated between antenna 1211 and processing circuitry 1220. Radio front end circuitry 1212 can be coupled to or a part of antenna 1211. In some embodiments, WD 1210 may not include separate radio front end circuitry 1212; rather, processing circuitry 1220 can comprise radio front end circuitry and can be connected to antenna 1211. Similarly, in some embodiments, some or all of RF transceiver circuitry 1222 can be considered a part of interface 1214. Radio front end circuitry 1212 can receive digital data that is to be sent out to other network nodes or WDs via a wireless connection. Radio front end circuitry 1212 can convert the digital data into a radio signal having the appropriate channel and bandwidth parameters using a combination of filters 1218 and/or amplifiers 1216. The radio signal can then be transmitted via antenna 1211. Similarly, when receiving data, antenna 1211 can collect radio signals which are then converted into digital data by radio front end circuitry 1212. The digital data can be passed to processing circuitry 1220. In other embodiments, the interface can comprise different components and/or different combinations of components.

Processing circuitry 1220 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1210 functionality either alone or in combination with other WD 1210 components, such as device readable medium 1230. Such functionality can include any of the various wireless features or benefits discussed herein.

For example, processing circuitry 1220 can execute instructions stored in device readable medium 1230 or in memory within processing circuitry 1220 to provide the functionality disclosed herein. More specifically, instructions (also referred to as a computer program product) stored in medium 1230 can include instructions that, when executed by processor 1220, can configure wireless device 1210 to perform operations corresponding to various exemplary methods (e.g., procedures) described herein.

As illustrated, processing circuitry 1220 includes one or more of RF transceiver circuitry 1222, baseband processing circuitry 1224, and application processing circuitry 1226. In other embodiments, the processing circuitry can comprise different components and/or different combinations of components. In certain embodiments processing circuitry 1220 of WD 1210 can comprise a SOC. In some embodiments, RF transceiver circuitry 1222, baseband processing circuitry 1224, and application processing circuitry 1226 can be on separate chips or sets of chips. In alternative embodiments, part or all of baseband processing circuitry 1224 and application processing circuitry 1226 can be combined into one chip or set of chips, and RF transceiver circuitry 1222 can be on a separate chip or set of chips. In still alternative embodiments, part or all of RF transceiver circuitry 1222 and baseband processing circuitry 1224 can be on the same chip or set of chips, and application processing circuitry 1226 can be on a separate chip or set of chips. In yet other alternative embodiments, part or all of RF transceiver circuitry 1222, baseband processing circuitry 1224, and application processing circuitry 1226 can be combined in the same chip or set of chips. In some embodiments, RF transceiver circuitry 1222 can be a part of interface 1214. RF transceiver circuitry 1222 can condition RF signals for processing circuitry 1220.

In certain embodiments, some or all of the functionality described herein as being performed by a WD can be provided by processing circuitry 1220 executing instructions stored on device readable medium 1230, which in certain embodiments can be a computer-readable storage medium. In alternative embodiments, some or all of the functionality can be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 can be configured to perform any determining, calculating, or similar operations (e.g., certain obtaining operations) described herein as being performed by a WD. These operations, as performed by processing circuitry 1220, can include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 can be operable to store a computer program, software, an application including one or more of logic, rules, code, tables, etc. and/or other instructions capable of being executed by processing circuitry 1220. Device readable medium 1230 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1220. In some embodiments, processing circuitry 1220 and device readable medium 1230 can be considered to be integrated.

User interface equipment 1232 can include components that allow and/or facilitate a human user to interact with WD 1210. Such interaction can be of many forms, such as visual, audial, tactile, etc. User interface equipment 1232 can be operable to produce output to the user and to allow and/or facilitate the user to provide input to WD 1210. The type of interaction can vary depending on the type of user interface equipment 1232 installed in WD 1210. For example, if WD 1210 is a smart phone, the interaction can be via a touch screen; if WD 1210 is a smart meter, the interaction can be through a screen that provides usage (e.g., the number of gallons used) or a speaker that provides an audible alert (e.g., if smoke is detected). User interface equipment 1232 can include input interfaces, devices and circuits, and output interfaces, devices and circuits. User interface equipment 1232 can be configured to allow and/or facilitate input of information into WD 1210 and is connected to processing circuitry 1220 to allow and/or facilitate processing circuitry 1220 to process the input information. User interface equipment 1232 can include, for example, a microphone, a proximity or other sensor, keys/buttons, a touch display, one or more cameras, a USB port, or other input circuitry. User interface equipment 1232 is also configured to allow and/or facilitate output of information from WD 1210, and to allow and/or facilitate processing circuitry 1220 to output information from WD 1210. User interface equipment 1232 can include, for example, a speaker, a display, vibrating circuitry, a USB port, a headphone interface, or other output circuitry. Using one or more input and output interfaces, devices, and circuits, of user interface equipment 1232, WD 1210 can communicate with end users and/or the wireless network and allow and/or facilitate them to benefit from the functionality described herein.

Auxiliary equipment 1234 is operable to provide more specific functionality which may not be generally performed by WDs. This can comprise specialized sensors for doing measurements for various purposes, interfaces for additional types of communication such as wired communications etc. The inclusion and type of components of auxiliary equipment 1234 can vary depending on the embodiment and/or scenario.

Power source 1236 can, in some embodiments, be in the form of a battery or battery pack. Other types of power sources, such as an external power source (e.g., an electricity outlet), photovoltaic devices or power cells, can also be used. WD 1210 can further comprise power circuitry 1237 for delivering power from power source 1236 to the various parts of WD 1210 which need power from power source 1236 to carry out any functionality described or indicated herein. Power circuitry 1237 can in certain embodiments comprise power management circuitry. Power circuitry 1237 can additionally or alternatively be operable to receive power from an external power source; in which case WD 1210 can be connectable to the external power source (such as an electricity outlet) via input circuitry or an interface such as an electrical power cable. Power circuitry 1237 can also in certain embodiments be operable to deliver power from an external power source to power source 1236. This can be, for example, for the charging of power source 1236. Power circuitry 1237 can perform any converting or other modification to the power from power source 1236 to make it suitable for supply to the respective components of WD 1210.

Figure 13:
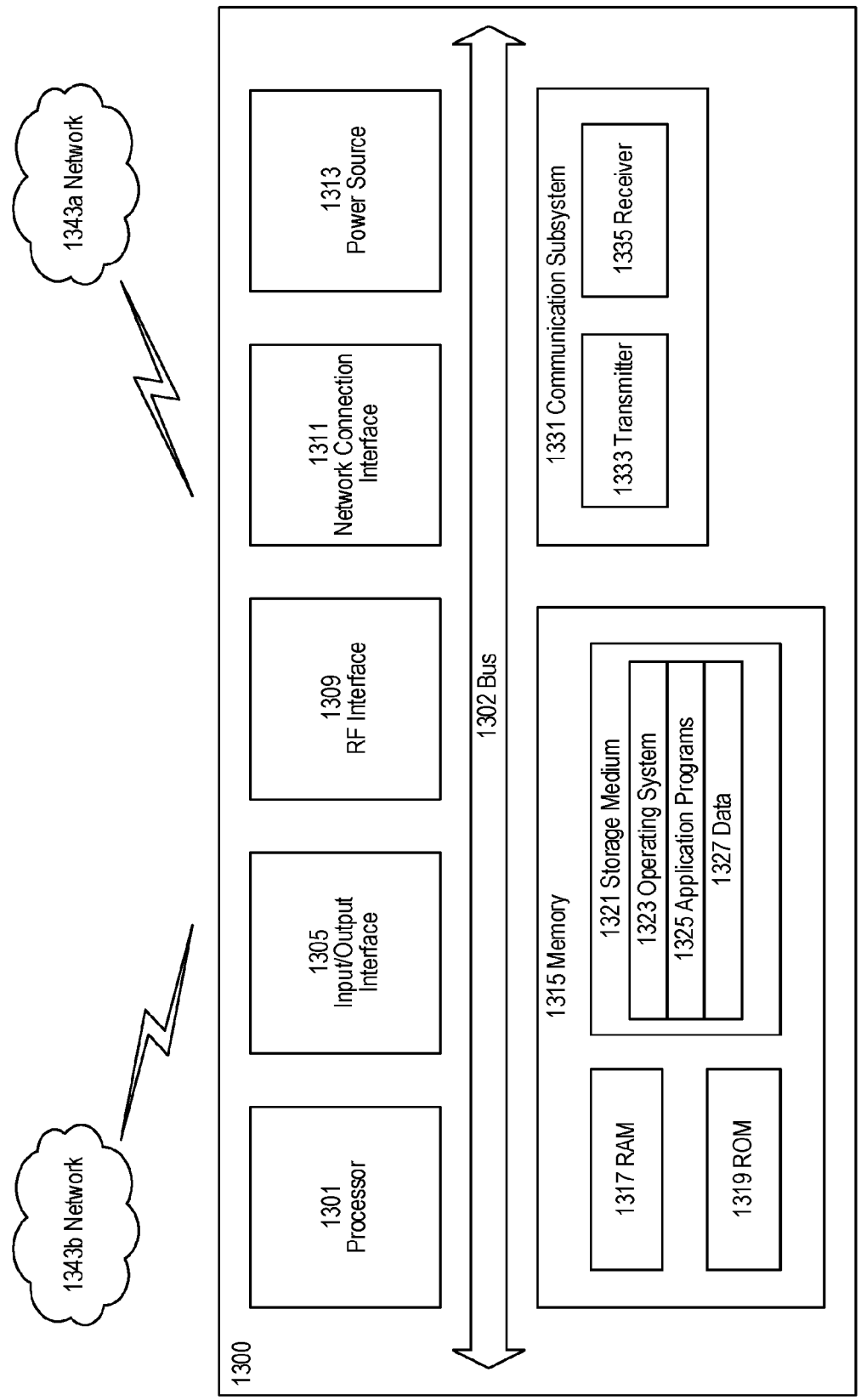
FIG. 13 is a block diagram of a user equipment according to some embodiments.

FIG. 13 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 13200 can be any UE identified by the 3$^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE can be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 can include other similar types of information. Certain UEs can utilize all of the components shown in FIG. 13, or only a subset of the components. The level of integration between the components can vary from one UE to another UE. Further, certain UEs can contain multiple instances of a component, such as multiple processors, memories, transceivers, transmitters, receivers, etc.

In FIG. 13, processing circuitry 1301 can be configured to process computer instructions and data. Processing circuitry 1301 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 can include two central processing units (CPUs). Data can be information in a form suitable for use by a computer.

In the depicted embodiment, input/output interface 1305 can be configured to provide a communication interface to an input device, output device, or input and output device. UE 1300 can be configured to use an output device via input/output interface 1305. An output device can use the same type of interface port as an input device. For example, a USB port can be used to provide input to and output from UE 1300. The output device can be a speaker, a sound card, a video card, a display, a monitor, a printer, an actuator, an emitter, a smartcard, another output device, or any combination thereof. UE 1300 can be configured to use an input device via input/output interface 1305 to allow and/or facilitate a user to capture information into UE 1300. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 13, RF interface 1309 can be configured to provide a communication interface to RF components such as a transmitter, a receiver, and an antenna. Network connection interface 1311 can be configured to provide a communication interface to network 1343a. Network 1343a can encompass wired and/or wireless networks such as a local-area network (LAN), a wide-area network (WAN), a computer network, a wireless network, a telecommunications network, another like network or any combination thereof. For example, network 1343a can comprise a Wi-Fi network. Network connection interface 1311 can be configured to include a receiver and a transmitter interface used to communicate with one or more other devices over a communication network according to one or more communication protocols, such as Ethernet, TCP/IP, SONET, ATM, or the like. Network connection interface 1311 can implement receiver and transmitter functionality appropriate to the communication network links (e.g., optical, electrical, and the like). The transmitter and receiver functions can share circuit components, software or firmware, or alternatively can be implemented separately.

RAM 1317 can be configured to interface via bus 1302 to processing circuitry 1301 to provide storage or caching of data or computer instructions during the execution of software programs such as the operating system, application programs, and device drivers. ROM 1319 can be configured to provide computer instructions or data to processing circuitry 1301. For example, ROM 1319 can be configured to store invariant low-level system code or data for basic system functions such as basic input and output (I/O), startup, or reception of keystrokes from a keyboard that are stored in a non-volatile memory. Storage medium 1321 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1321 can be configured to include operating system 1323; application program 1325 such as a web browser application, a widget or gadget engine or another application; and data file 1327. Storage medium 1321 can store, for use by UE 1300, any of a variety of various operating systems or combinations of operating systems. For example, application program 1325 can include executable program instructions (also referred to as a computer program product) that, when executed by processor 1301, can configure UE 1300 to perform operations corresponding to various exemplary methods (e.g., procedures) described herein.

Storage medium 1321 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 can allow and/or facilitate UE 1300 to access computer-executable instructions, application programs or the like, stored on transitory or non-transitory memory media, to off-load data, or to upload data. An article of manufacture, such as one utilizing a communication system can be tangibly embodied in storage medium 1321, which can comprise a device readable medium.

In FIG. 13, processing circuitry 1301 can be configured to communicate with network 1343b using communication subsystem 1331. Network 1343a and network 1343b can be the same network or networks or different network or networks. Communication subsystem 1331 can be configured to include one or more transceivers used to communicate with network 1343b. For example, communication subsystem 1331 can be configured to include one or more transceivers used to communicate with one or more remote transceivers of another device capable of wireless communication such as another WD, UE, or base station of a radio access network (RAN) according to one or more communication protocols, such as IEEE 802.13, CDMA, WCDMA, GSM, LTE, UTRAN, WiMax, or the like. Each transceiver can include transmitter 1333 and/or receiver 1335 to implement transmitter or receiver functionality, respectively, appropriate to the RAN links (e.g., frequency allocations and the like). Further, transmitter 1333 and receiver 1335 of each transceiver can share circuit components, software or firmware, or alternatively can be implemented separately.

In the illustrated embodiment, the communication functions of communication subsystem 1331 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 can include cellular communication, Wi-Fi communication, Bluetooth communication, and GPS communication. Network 1343b can encompass wired and/or wireless networks such as a local-area network (LAN), a wide-area network (WAN), a computer network, a wireless network, a telecommunications network, another like network or any combination thereof. For example, network 1343b can be a cellular network, a Wi-Fi network, and/or a near-field network. Power source 1313 can be configured to provide alternating current (AC) or direct current (DC) power to components of UE 1300.

The features, benefits and/or functions described herein can be implemented in one of the components of UE 1300 or partitioned across multiple components of UE 1300. Further, the features, benefits, and/or functions described herein can be implemented in any combination of hardware, software or firmware. In one example, communication subsystem 1331 can be configured to include any of the components described herein. Further, processing circuitry 1301 can be configured to communicate with any of such components over bus 1302. In another example, any of such components can be represented by program instructions stored in memory that when executed by processing circuitry 1301 perform the corresponding functions described herein. In another example, the functionality of any of such components can be partitioned between processing circuitry 1301 and communication subsystem 1331. In another example, the non-computationally intensive functions of any of such components can be implemented in software or firmware and the computationally intensive functions can be implemented in hardware.

Figure 14:
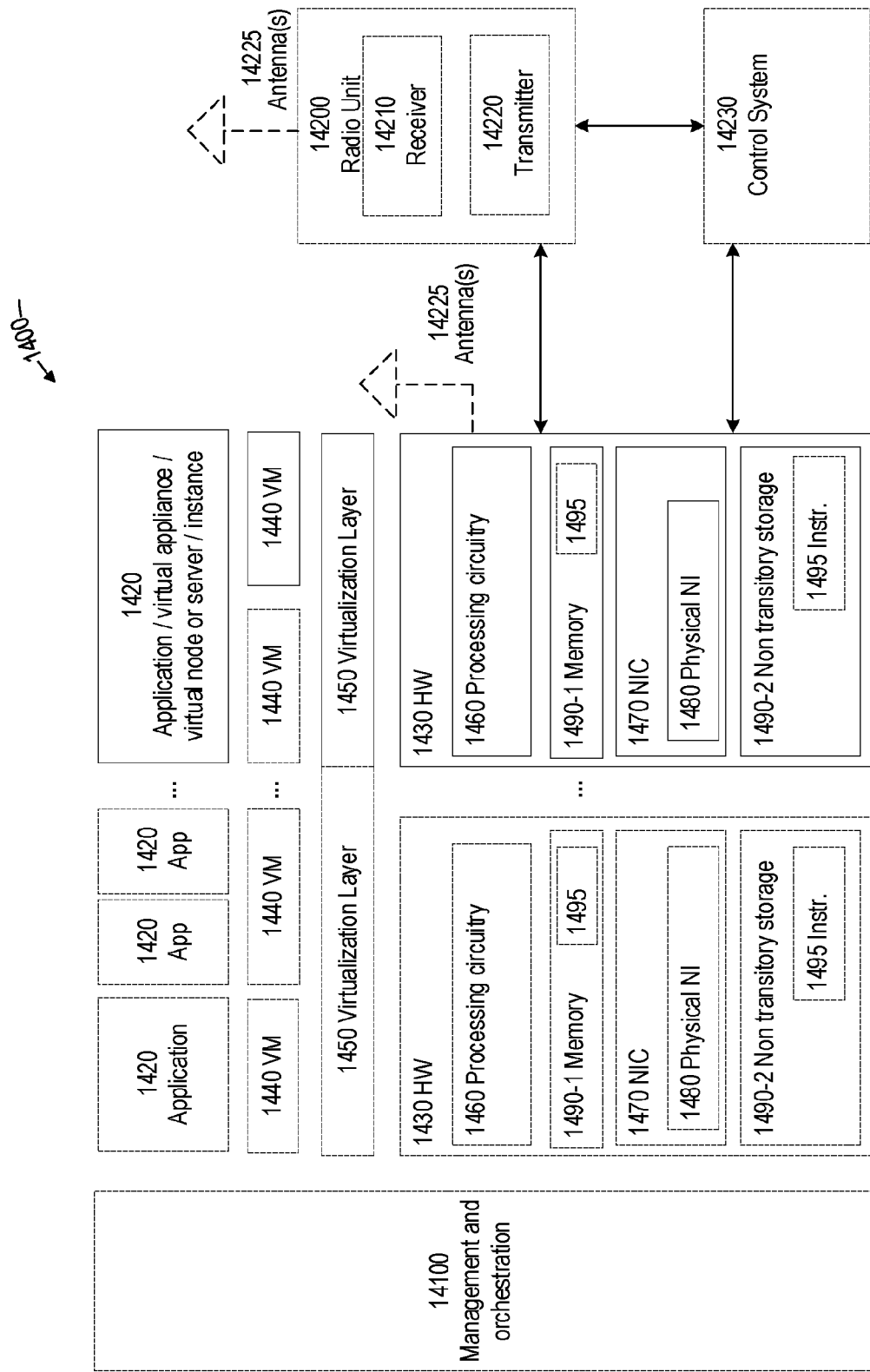
FIG. 14 is a block diagram of a virtualization environment according to some embodiments.

FIG. 14 is a schematic block diagram illustrating a virtualization environment 1400 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node can be entirely virtualized.

The functions can be implemented by one or more applications 1420 (which can alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400 can include general-purpose or special-purpose network hardware devices (or nodes) 1430 comprising a set of one or more processors or processing circuitry 1460, which can be commercial off-the-shelf (COTS) processors, dedicated Application Specific Integrated Circuits (ASICs), or any other type of processing circuitry including digital or analog hardware components or special purpose processors. Each hardware device can comprise memory 1490-1 which can be non-persistent memory for temporarily storing instructions 1495 or software executed by processing circuitry 1460. For example, instructions 1495 can include program instructions (also referred to as a computer program product) that, when executed by processing circuitry 1460, can configure hardware node 1420 to perform operations corresponding to various exemplary methods (e.g., procedures) described herein. Such operations can also be attributed to virtual node(s) 1420 that is/are hosted by hardware node 1430.

Each hardware device can comprise one or more network interface controllers (NICs) 1470, also known as network interface cards, which include physical network interface 1480. Each hardware device can also include non-transitory, persistent, machine-readable storage media 1490-2 having stored therein software 1495 and/or instructions executable by processing circuitry 1460. Software 1495 can include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and can be run by a corresponding virtualization layer 1450 or hypervisor. Different embodiments of the instance of virtual appliance 1420 can be implemented on one or more of virtual machines 1440, and the implementations can be made in different ways.

During operation, processing circuitry 1460 executes software 1495 to instantiate the hypervisor or virtualization layer 1450, which can sometimes be referred to as a virtual machine monitor (VMM). Virtualization layer 1450 can present a virtual operating platform that appears like networking hardware to virtual machine 1440.

As shown in FIG. 14, hardware 1430 can be a standalone network node with generic or specific components. Hardware 1430 can comprise antenna 14225 and can implement some functions via virtualization. Alternatively, hardware 1430 can be part of a larger cluster of hardware (e.g., such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 1440 can be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 can be coupled to one or more antennas 14225. Radio units 14200 can communicate directly with hardware nodes 1430 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 14230, which can alternatively be used for communication between the hardware nodes 1430 and radio units 14200.

Figure 15:
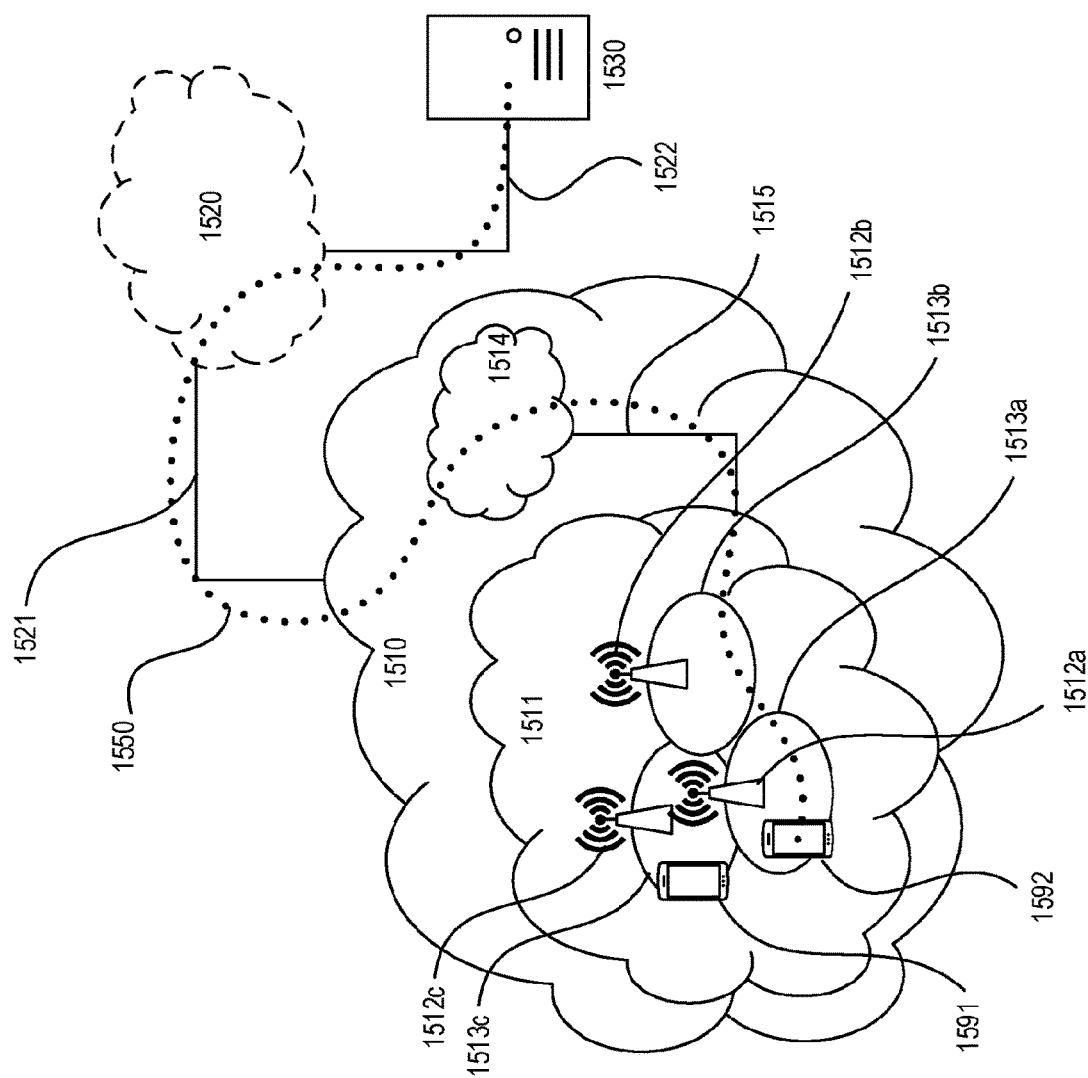
FIG. 15 is a block diagram of a communication network with a host computer according to some embodiments.

With reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512a, 1512b, 1512c, such as NBs, eNBs, gNBs or other types of wireless access points, each defining a corresponding coverage area 1513a, 1513b, 1513c. Each base station 1512a, 1512b, 1512c is connectable to core network 1514 over a wired or wireless connection 1515. A first UE 1591 located in coverage area 1513c can be configured to wirelessly connect to, or be paged by, the corresponding base station 1512c. A second UE 1592 in coverage area 1513a is wirelessly connectable to the corresponding base station 1512a. While a plurality of UEs 1591, 1592 are illustrated in this example, the disclosed embodiments are equally applicable to a situation where a sole UE is in the coverage area or where a sole UE is connecting to the Telecommunication network 1510 is itself connected to host computer 1530, which can be embodied in the hardware and/or software of a standalone server, a cloud-implemented server, a distributed server or as processing resources in a server farm. Host computer 1530 can be under the ownership or control of a service provider or can be operated by the service provider or on behalf of the service provider. Connections 1521 and 1522 between telecommunication network 1510 and host computer 1530 can extend directly from core network 1514 to host computer 1530 or can go via an optional intermediate network 1520. Intermediate network 1520 can be one of, or a combination of more than one of, a public, private or hosted network; intermediate network 1520, if any, can be a backbone network or the Internet; in particular, intermediate network 1520 can comprise two or more sub-networks (not shown).

The communication system of FIG. 15 as a whole enables connectivity between the connected UEs 1591, 1592 and host computer 1530. The connectivity can be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 can be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Example implementations, in accordance with an embodiment, of the UE, base station and host computer discussed in the preceding paragraphs will now be described with reference to FIG. 16. In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which can have storage and/or processing capabilities. In particular, processing circuitry 1618 can comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 can be operable to provide a service to a remote user, such as UE 1630 connecting via OTT connection 1650 terminating at UE 1630 and host computer 1610. In providing the service to the remote user, host application 1612 can provide user data which is transmitted using OTT connection 1650.

Communication system 1600 can also include base station 1620 provided in a telecommunication system and comprising hardware 1625 enabling it to communicate with host computer 1610 and with UE 1630. Hardware 1625 can include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 can be configured to facilitate connection 1660 to host computer 1610. Connection 1660 can be direct, or it can pass through a core network (not shown in FIG. 16) of the telecommunication system and/or through one or more intermediate networks outside the telecommunication system. In the embodiment shown, hardware 1625 of base station 1620 can also include processing circuitry 1628, which can comprise one or more programmable processors, application-specific integrated circuits, field programmable gate arrays or combinations of these (not shown) adapted to execute instructions.

Base station 1620 also includes software 1621 stored internally or accessible via an external connection. For example, software 1621 can include program instructions (also referred to as a computer program product) that, when executed by processing circuitry 1628, can configure base station 1620 to perform operations corresponding to various exemplary methods (e.g., procedures) described herein.

Communication system 1600 can also include UE 1630 already referred to, whose hardware 1635 can include radio interface 1637 configured to set up and maintain wireless connection 1670 with a base station serving a coverage area in which UE 1630 is currently located. Hardware 1635 of UE 1630 can also include processing circuitry 1638, which can comprise one or more programmable processors, application-specific integrated circuits, field programmable gate arrays or combinations of these (not shown) adapted to execute instructions.

UE 1630 also includes software 1631, which is stored in or accessible by UE 1630 and executable by processing circuitry 1638. Software 1631 includes client application 1632. Client application 1632 can be operable to provide a service to a human or non-human user via UE 1630, with the support of host computer 1610. In host computer 1610, an executing host application 1612 can communicate with the executing client application 1632 via OTT connection 1650 terminating at UE 1630 and host computer 1610. In providing the service to the user, client application 1632 can receive request data from host application 1612 and provide user data in response to the request data. OTT connection 1650 can transfer both the request data and the user data. Client application 1632 can interact with the user to generate the user data that it provides. Software 1631 can also include program instructions (also referred to as a computer program product) that, when executed by processing circuitry 1638, can configure UE 1630 to perform operations corresponding to various exemplary methods (e.g., procedures) described herein.

Figure 16:
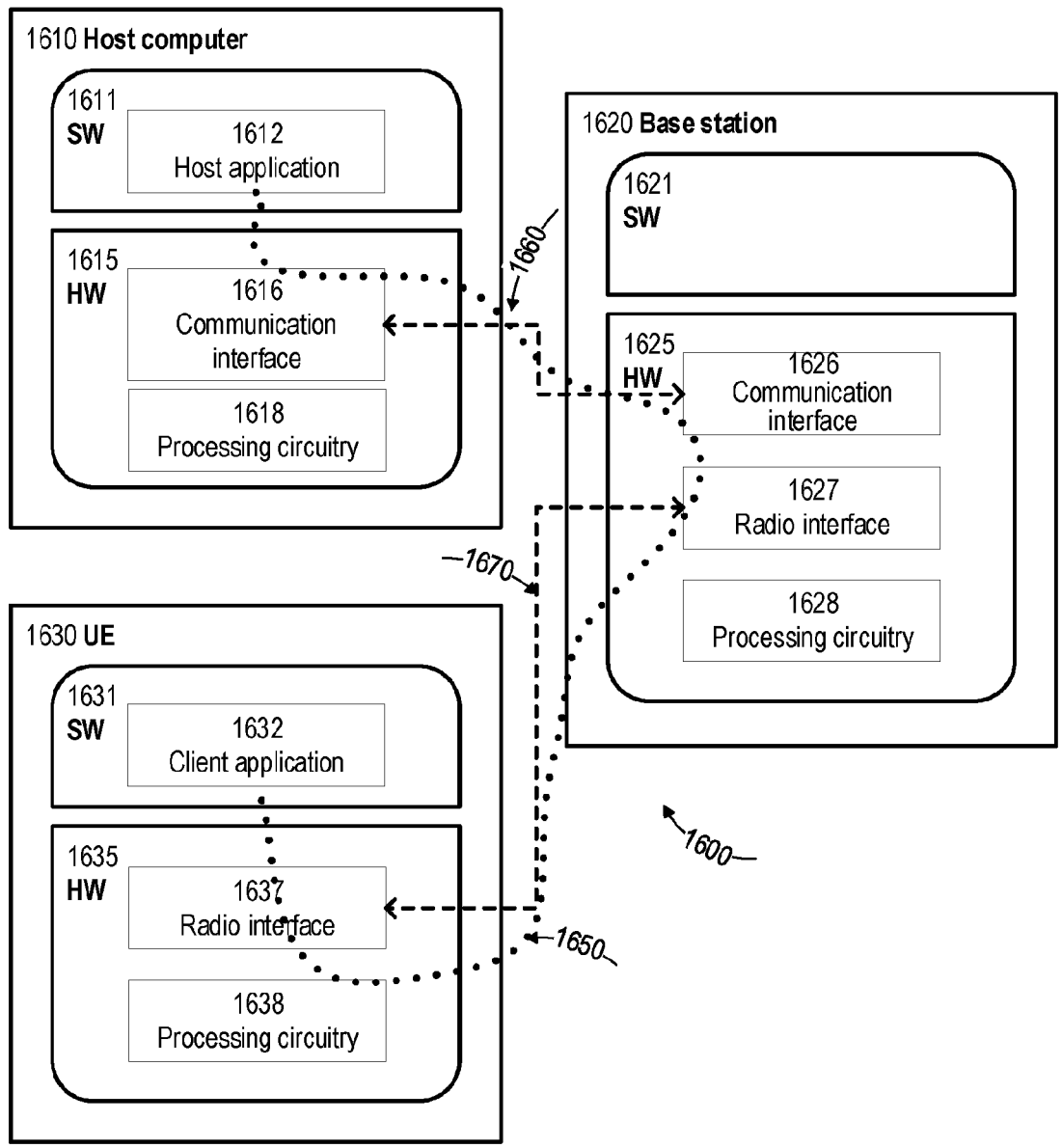
FIG. 16 is a block diagram of a host computer according to some embodiments.

As an example, host computer 1610, base station 1620 and UE 1630 illustrated in FIG. 16 can be similar or identical to host computers or base stations described in relation to other figures herein. For example, the inner workings of these entities can be as shown in FIG. 16 and independently, the surrounding network topology can be that shown in other figures herein.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure can determine the routing, which it can be configured to hide from UE 1630 or from the service provider operating host computer 1610, or both. While OTT connection 1650 is active, the network infrastructure can further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1650 between host computer 1610 and UE 1630, in response to variations in the measurement results. The measurement procedure and/or the network functionality for reconfiguring OTT connection 1650 can be implemented in software 1611 and hardware 1615 of host computer 1610 or in software 1631 and hardware 1635 of UE 1630, or both. In embodiments, sensors (not shown) can be deployed in or in association with communication devices through which OTT connection 1650 passes; the sensors can participate in the measurement procedure by supplying values of the monitored quantities exemplified above, or supplying values of other physical quantities from which software 1611, 1631 can compute or estimate the monitored quantities. The reconfiguring of OTT connection 1650 can include message format, retransmission settings, preferred routing etc.; the reconfiguring need not affect base station 1620, and it can be unknown or imperceptible to base station 1620. Such procedures and functionalities can be known and practiced in the art. In certain embodiments, measurements can involve proprietary UE signaling facilitating host computer 1610's measurements of throughput, propagation times, latency and the like. The measurements can be implemented in that software 1611 and 1631 causes messages to be transmitted, in particular empty or 'dummy' messages, using OTT connection 1650 while it monitors propagation times, errors, etc.

Figure 17:
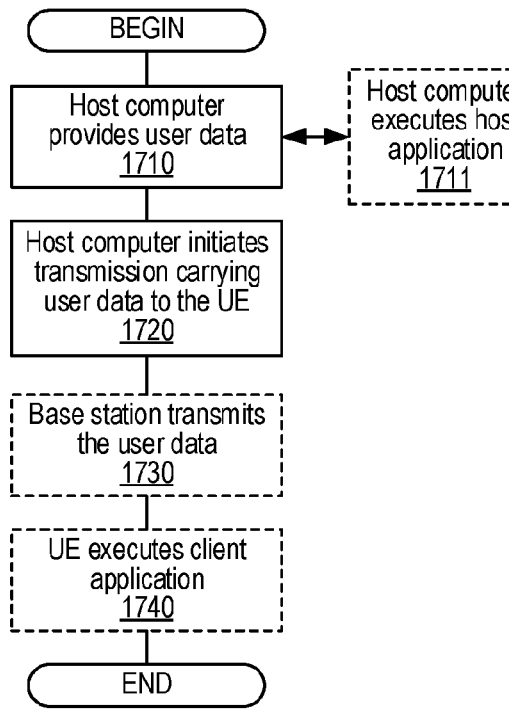
FIGS. 17-20 are flowcharts illustrating various methods implemented in a communication system, in accordance with various embodiments.

FIG. 17 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 17 will be included in this section. In step 1710, the host computer provides user data. In substep 1711 (which can be optional) of step 1710, the host computer provides the user data by executing a host application. In step 1720, the host computer initiates a transmission carrying the user data to the UE. In step 1730 (which can be optional), the base station transmits to the UE the user data which was carried in the transmission that the host computer initiated, in accordance with the teachings of the embodiments described throughout this disclosure. In step 1740 (which can also be optional), the UE executes a client application associated with the host application executed by the host computer.

Figure 18:
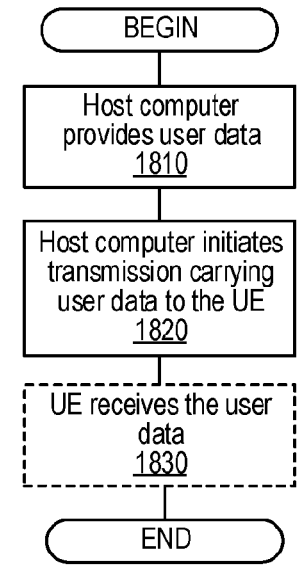

FIG. 18 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission can pass via the base station, in accordance with the teachings of the embodiments described throughout this disclosure. In step 1830 (which can be optional), the UE receives the user data carried in the transmission.

Figure 19:
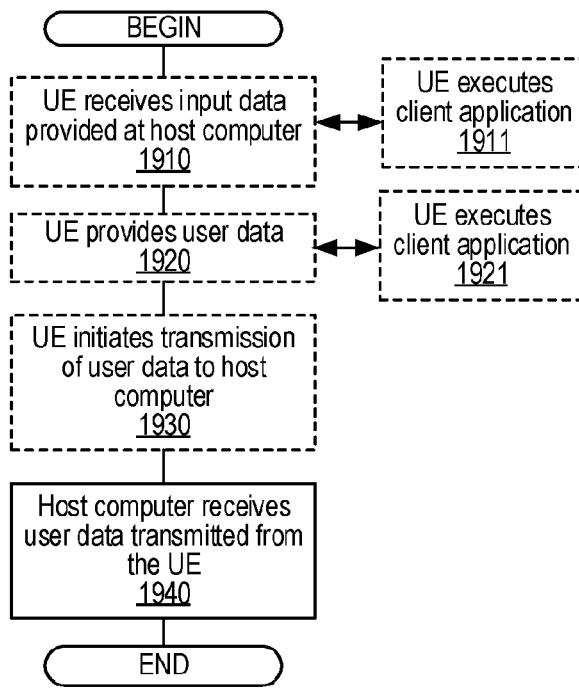

FIG. 19 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 19 will be included in this section. In step 1910 (which can be optional), the UE receives input data provided by the host computer. Additionally or alternatively, in step 1920, the UE provides user data. In substep 1921 (which can be optional) of step 1920, the UE provides the user data by executing a client application. In substep 1911 (which can be optional) of step 1910, the UE executes a client application which provides the user data in reaction to the received input data provided by the host computer. In providing the user data, the executed client application can further consider user input received from the user. Regardless of the specific manner in which the user data was provided, the UE initiates, in substep 1930 (which can be optional), transmission of the user data to the host computer. In step 1940 of the method, the host computer receives the user data transmitted from the UE, in accordance with the teachings of the embodiments described throughout this disclosure.

Figure 20:
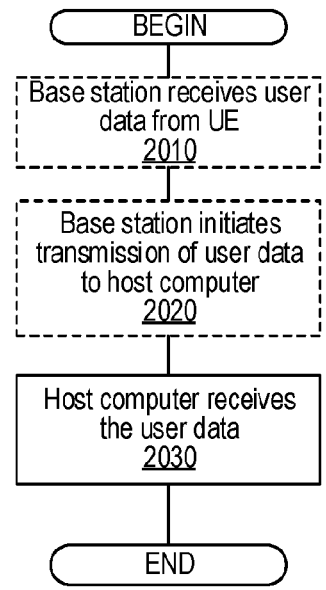

FIG. 20 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 20 will be included in this section. In step 2010 (which can be optional), in accordance with the teachings of the embodiments described throughout this disclosure, the base station receives user data from the UE. In step 2020 (which can be optional), the base station initiates transmission of the received user data to the host computer. In step 2030 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Exemplary embodiments of the present disclosure include, but are not limited to, the following enumerated examples that are divided into groups of related embodiments.

Group A Embodiments

A1. A method performed by a wireless device, the method comprising:
receiving, from a network node, control signaling that indicates a parameter configuration according to which transmissions for a certain subset of one or more error control processes are to be performed.

A2. The method of embodiment A1, wherein the one or more error control processes in the certain subset include one or more error control processes that are identified by one or more respective error control process identities, wherein the control signaling indicates the one or more respective error control process identities.

A3. The method of embodiment A1, wherein the one or more error control processes in the certain subset include any error control process of a certain type.

A4. The method of any of embodiments A1-A3, wherein the one or more error control processes in the certain subset include any error control process for which error control feedback is disabled or include any error control process for which error control feedback is enabled.

A5. The method of any of embodiments A1-A4, wherein the parameter configuration includes a configuration of one or more power control parameters.

A6. The method of embodiment A5, wherein the one or more power control parameters include one or more of:
a nominal target received power;
a pathloss compensation factor;
a delta modulation and coding scheme;
a transmit power control accumulation;
a number of power control adjustment states maintained by the wireless device; or
a parameter that maps a transmit power control command field in downlink control information to an absolute or accumulated closed loop power control value.

A7. The method of any of embodiments A1-A6, wherein the parameter configuration includes a configuration of actual transmit power level.

A8. The method of embodiment A7, wherein the control signaling indicates configuration of the actual transmit power level by indicating whether or not transmissions for the certain subset of one or more error control processes are to be performed with maximum transmit power.

A9. The method of embodiment A7, wherein the control signaling indicates configuration of the actual transmit power level by indicating with which of multiple possible actual transmit power levels transmissions for the certain subset of one or more error control processes are to be performed.

A10. The method of any of embodiments A1-A9, wherein the parameter configuration includes a configuration of one or more:
an aggregation factor indicating a number of consecutive downlink slots scheduled by downlink control information;
a transmission waveform type;
a modulation and coding scheme table;
a time domain resource allocation table;
a type of frequency resource allocation;
a block error rate target;
a physical resource block bundling configuration;
a type of physical downlink shared channel mapping; or
a physical uplink shared channel transmission scheme.

A11. The method of any of embodiments A1-A10, wherein the one or more error control processes are controlled by a medium access control, MAC, layer.

A12. The method of any of embodiments A1-A11, wherein the one or more error control processes are one or more hybrid automatic repeat request, HARQ, processes.

A13. The method of any of embodiments A1-A12, further comprising transmitting or receiving transmissions for the certain subset of one or more error control processes according to the indicated parameter configuration.

A14. The method of any of embodiments A1-A13, wherein the transmissions for the certain subset of one or more error control processes are to be performed via a non-terrestrial network.

A15. The method of any of embodiments A1-A14, wherein the control signaling indicates different parameter configurations according to which transmissions for different subsets of one or more error control processes are to be performed, wherein the different subsets include a subset of one or more error control processes for which error control feedback is disabled and a subset of one or more error control processes for which error control feedback is enabled.

A16. A method performed by a wireless device, the method comprising:
 transmitting or receiving transmissions for different subsets of one or more error control processes according to different parameter configurations.

A17. The method of embodiment A16, wherein the different subsets include a subset of one or more error control processes for which error control feedback is disabled and a subset of one or more error control processes for which error control feedback is enabled.

A18. The method of any of embodiments A16-A17, wherein the different parameter configurations include different configurations of one or more power control parameters.

A19. The method of embodiment A18, wherein the one or more power control parameters include one or more of:
 a nominal target received power;
 a pathloss compensation factor;
 a delta modulation and coding scheme;
 a transmit power control accumulation;
 a number of power control adjustment states maintained by the wireless device; or
 a parameter that maps a transmit power control command field in downlink control information to an absolute or accumulated closed loop power control value.

A20. The method of any of embodiments A16-A19, wherein the different parameter configurations include different configurations of actual transmit power level.

A21. The method of any of embodiments A16-A20, wherein the different parameter configurations include different configurations of one or more:
 an aggregation factor indicating a number of consecutive downlink slots scheduled by downlink control information;
 a transmission waveform type;
 a modulation and coding scheme table;
 a time domain resource allocation table;
 a type of frequency resource allocation;
 a block error rate target;
 a physical resource block bundling configuration;
 a type of physical downlink shared channel mapping; or
 a physical uplink shared channel transmission scheme.

A22. The method of any of embodiments A16-A21, wherein the one or more error control processes in each of the different subsets are controlled by a medium access control, MAC, layer.

A23. The method of any of embodiments A16-A22, wherein the one or more error control processes in each of the different subsets are one or more hybrid automatic repeat request, HARQ, processes.

A24. The method of any of embodiments A16-A13, wherein the transmissions are transmitted or received via a non-terrestrial network.

A25. A method performed by a wireless device, the method comprising:
 transmitting, to a network node, error control feedback for a set of downlink transmissions according to an error control feedback codebook, wherein, for any downlink transmission for an error control process for which error control feedback is disabled, the error control feedback codebook encodes feedback for that downlink transmission as negative acknowledgement feedback.

A26. The method of embodiment A25, wherein the downlink transmissions are received by the wireless device via a non-terrestrial network.

A27. The method of any of embodiments A25-A26, wherein the error control feedback is hybrid automatic repeat request, HARQ, feedback and the error control process is a HARQ process.

A27A. The method of any of embodiments A25-A27, further comprising generating the error control feedback according to the error control feedback codebook.

A28. A method performed by a wireless device, the method comprising:
 receiving a downlink control information message that schedules a downlink transmission for a certain error control process and that includes a set of one or more fields whose interpretation depends on whether error control feedback is enabled or disabled for the certain error control process.

A29. The method of embodiment A28, wherein the one or more fields in the set include one or more of:
 a downlink assignment indicator field;
 a redundancy version field;
 a feedback timing field; or
 a physical uplink control channel resource indicator field.

A30. The method of any of embodiments A28-A29, wherein, when the error control feedback is disabled, the set of one or more fields indicates an aggregation factor indicating a number of consecutive downlink slots associated with the scheduled downlink transmission.

A31. The method of any of embodiments A28-A29, wherein, when the error control feedback is disabled, the set of one or more fields, in combination with an error control process number field in the downlink control information message, indicates an error control process number that identifies the certain error control process.

A32. The method of any of embodiments A28-A31, further comprising interpreting the set of one or more fields depending on whether error control feedback is enabled or disabled for the certain error control process.

A33. The method of any of embodiments A28-A32, further comprising receiving the downlink transmission in accordance with the received downlink control information message.

A34. The method of any of embodiments A28-A33, wherein the downlink transmission is received by the wireless device via a non-terrestrial network.

A35. The method of any of embodiments A28-A34, wherein the error control feedback is hybrid automatic repeat request, HARQ, feedback and the error control process is a HARQ process.

A36. A method performed by a wireless device, the method comprising:
 receiving, from a network node, control signaling that indicates a parameter configuration according to which transmissions for a certain error control process, or for a certain type of error control process, are to be performed.

A37. A method performed by a wireless device, the method comprising:
receiving, from a network node, control signaling that indicates a parameter configuration according to which transmissions are to be performed for any error control process for which error control feedback is disabled.

A38. A method performed by a wireless device, the method comprising:
receiving, from a network node, control signaling that indicates a parameter configuration according to which transmissions are to be performed for any error control process for which error control feedback is enabled.

A39. The method of any of embodiments A1-A38, further comprising:
providing user data; and
forwarding the user data to a host computer via the transmission to a base station.

Group B Embodiments

B1. A method performed by a network node, the method comprising:
transmitting, from the network node to a wireless device, control signaling that indicates a parameter configuration according to which transmissions for a certain subset of one or more error control processes are to be performed.

B2. The method of embodiment B1, wherein the one or more error control processes in the certain subset include one or more error control processes that are identified by one or more respective error control process identities, wherein the control signaling indicates the one or more respective error control process identities.

B3. The method of embodiment B1, wherein the one or more error control processes in the certain subset include any error control process of a certain type.

B4. The method of any of embodiment B1 and B3, wherein the one or more error control processes in the certain subset include any error control process for which error control feedback is disabled or include any error control process for which error control feedback is enabled.

B5. The method of any of embodiments B1-B4, wherein the parameter configuration includes a configuration of one or more power control parameters.

B6. The method of embodiment B5, wherein the one or more power control parameters include one or more of:
a nominal target received power;
a pathloss compensation factor;
a delta modulation and coding scheme;
a transmit power control accumulation;
a number of power control adjustment states maintained by the wireless device; or
a parameter that maps a transmit power control command field in downlink control information to an absolute or accumulated closed loop power control value.

B7. The method of any of embodiments B1-B6, wherein the parameter configuration includes a configuration of actual transmit power level.

B8. The method of embodiment B7, wherein the control signaling indicates configuration of the actual transmit power level by indicating whether or not transmissions for the certain subset of one or more error control processes are to be performed with maximum transmit power.

B9. The method of embodiment B7, wherein the control signaling indicates configuration of the actual transmit power level by indicating with which of multiple possible actual transmit power levels transmissions for the certain subset of one or more error control processes are to be performed.

B10. The method of any of embodiments B1-B9, wherein the parameter configuration includes a configuration of one or more:
an aggregation factor indicating a number of consecutive downlink slots scheduled by downlink control information;
a transmission waveform type;
a modulation and coding scheme table;
a time domain resource allocation table;
a type of frequency resource allocation;
a block error rate target;
a physical resource block bundling configuration;
a type of physical downlink shared channel mapping; or
a physical uplink shared channel transmission scheme.

B11. The method of any of embodiments B1-610, wherein the one or more error control processes are controlled by a medium access control, MAC, layer.

B12. The method of any of embodiments B1-611, wherein the one or more error control processes are one or more hybrid automatic repeat request, HARQ, processes.

B13. The method of any of embodiments B1-B12, further comprising transmitting or receiving transmissions for the certain subset of one or more error control processes according to the indicated parameter configuration.

B14. The method of any of embodiments B1-B13, wherein the transmissions for the certain subset of one or more error control processes are to be performed via a non-terrestrial network.

B15. The method of any of embodiments B1-B14, wherein the control signaling indicates different parameter configurations according to which transmissions for different subsets of one or more error control processes are to be performed, wherein the different subsets include a subset of one or more error control processes for which error control feedback is disabled and a subset of one or more error control processes for which error control feedback is enabled.

B16. A method performed by a network node, the method comprising:
transmitting or receiving transmissions for different subsets of one or more error control processes according to different parameter configurations.

B17. The method of embodiment B16, wherein the different subsets include a subset of one or more error control processes for which error control feedback is disabled and a subset of one or more error control processes for which error control feedback is enabled.

B18. The method of any of embodiments B16-617, wherein the different parameter configurations include different configurations of one or more power control parameters.

B19. The method of embodiment B18, wherein the one or more power control parameters include one or more of:
a nominal target received power;
a pathloss compensation factor;
a delta modulation and coding scheme;
a transmit power control accumulation;
a number of power control adjustment states maintained by the wireless device; or
a parameter that maps a transmit power control command field in downlink control information to an absolute or accumulated closed loop power control value.

B20. The method of any of embodiments B16-B19, wherein the different parameter configurations include different configurations of actual transmit power level.

B21. The method of any of embodiments B16-620, wherein the different parameter configurations include different configurations of one or more:
- an aggregation factor indicating a number of consecutive downlink slots scheduled by downlink control information;
- a transmission waveform type;
- a modulation and coding scheme table;
- a time domain resource allocation table;
- a type of frequency resource allocation;
- a block error rate target;
- a physical resource block bundling configuration;
- a type of physical downlink shared channel mapping; or
- a physical uplink shared channel transmission scheme.

B22. The method of any of embodiments B16-621, wherein the one or more error control processes in each of the different subsets are controlled by a medium access control, MAC, layer.

B23. The method of any of embodiments B16-622, wherein the one or more error control processes in each of the different subsets are one or more hybrid automatic repeat request, HARQ, processes.

B24. The method of any of embodiments B16-B13, wherein the transmissions are transmitted or received via a non-terrestrial network.

B25. A method performed by a network node, the method comprising:
- receiving, from a wireless device, error control feedback for a set of downlink transmissions according to an error control feedback codebook, wherein, for any downlink transmission for an error control process for which error control feedback is disabled, the error control feedback codebook encodes feedback for that downlink transmission as negative acknowledgement feedback.

B26. The method of embodiment B25, wherein the downlink transmissions are transmitted by the network node via a non-terrestrial network.

B27. The method of any of embodiments B25-B26, wherein the error control feedback is hybrid automatic repeat request, HARQ, feedback and the error control process is a HARQ process.

B27A. The method of any of embodiments B25-B27, further comprising processing the received error control feedback according to the error control feedback codebook.

B28. A method performed by a network node, the method comprising:
- transmitting, to a wireless device, a downlink control information message that schedules a downlink transmission for a certain error control process and that includes a set of one or more fields whose interpretation depends on whether error control feedback is enabled or disabled for the certain error control process.

B29. The method of embodiment B28, wherein the one or more fields in the set include one or more of:
- a downlink assignment indicator field;
- a redundancy version field;
- a feedback timing field; or
- a physical uplink control channel resource indicator field.

B30. The method of any of embodiments B28-B29, wherein, when the error control feedback is disabled, the set of one or more fields indicates an aggregation factor indicating a number of consecutive downlink slots associated with the scheduled downlink transmission.

B31. The method of any of embodiments B28-B29, wherein, when the error control feedback is disabled, the set of one or more fields, in combination with an error control process number field in the downlink control information message, indicates an error control process number that identifies the certain error control process.

B32. The method of any of embodiments B28-B31, further comprising encoding the set of one or more fields depending on whether error control feedback is enabled or disabled for the certain error control process.

B33. The method of any of embodiments B28-B32, further comprising transmitting the downlink transmission in accordance with the transmitted downlink control information message.

B34. The method of any of embodiments B28-B33, wherein the downlink transmission is transmitted via a non-terrestrial network.

B35. The method of any of embodiments B28-B34, wherein the error control feedback is hybrid automatic repeat request, HARQ, feedback and the error control process is a HARQ process.

B36. The method of any of embodiments B1-1335, further comprising:
- obtaining user data; and
- forwarding the user data to a host computer or a wireless device.

Group C Embodiments

C1. A wireless device configured to perform any of the steps of any of the Group A embodiments.

C2. A wireless device comprising processing circuitry configured to perform any of the steps of any of the Group A embodiments.

C3. A wireless device comprising:
- communication circuitry; and
- processing circuitry configured to perform any of the steps of any of the Group A embodiments.

C4. A wireless device comprising:
- processing circuitry configured to perform any of the steps of any of the Group A embodiments; and
- power supply circuitry configured to supply power to the wireless device.

C5. A wireless device comprising:
- processing circuitry and memory, the memory containing instructions executable by the processing circuitry whereby the wireless device is configured to perform any of the steps of any of the Group A embodiments.

C6. A user equipment (UE) comprising:
- an antenna configured to send and receive wireless signals;
- radio front-end circuitry connected to the antenna and to processing circuitry, and configured to condition signals communicated between the antenna and the processing circuitry;
- the processing circuitry being configured to perform any of the steps of any of the Group A embodiments;
- an input interface connected to the processing circuitry and configured to allow input of information into the UE to be processed by the processing circuitry;
- an output interface connected to the processing circuitry and configured to output information from the UE that has been processed by the processing circuitry; and
- a battery connected to the processing circuitry and configured to supply power to the UE.

C7. A computer program comprising instructions which, when executed by at least one processor of a wireless device, causes the wireless device to carry out the steps of any of the Group A embodiments.

C8. A carrier containing the computer program of embodiment C7, wherein the carrier is one of an electronic signal, optical signal, radio signal, or computer readable storage medium.

C9. A radio network node configured to perform any of the steps of any of the Group B embodiments.

C10. A radio network node comprising processing circuitry configured to perform any of the steps of any of the Group B embodiments.

C11. A radio network node comprising:
  communication circuitry; and
  processing circuitry configured to perform any of the steps of any of the Group B embodiments.

C12. A radio network node comprising:
  processing circuitry configured to perform any of the steps of any of the Group B embodiments; and
  power supply circuitry configured to supply power to the radio network node.

C13. A radio network node comprising:
  processing circuitry and memory, the memory containing instructions executable by the processing circuitry whereby the radio network node is configured to perform any of the steps of any of the Group B embodiments.

C14. The radio network node of any of embodiments C9-C13, wherein the radio network node is a base station.

C15. A computer program comprising instructions which, when executed by at least one processor of a radio network node, causes the radio network node to carry out the steps of any of the Group B embodiments.

C16. The computer program of embodiment C14, wherein the radio network node is a base station.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps of any of the Group B embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:
  the processing circuitry of the host computer is configured to execute a host application, thereby providing the user data; and
  the UE comprises processing circuitry configured to execute a client application associated with the host application.

D5. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
  the processing circuitry of the host computer is configured to execute a host application, thereby providing the user data; and
  the UE's processing circuitry is configured to execute a client application associated with the host application.

D12. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:
  communication interface configured to receive user data originating from a transmission from a user equipment (UE) to a base station,
  wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
the processing circuitry of the host computer is configured to execute a host application; and
the UE's processing circuitry is configured to execute a client application associated with
the host application, thereby providing the user data.

D18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
the processing circuitry of the host computer is configured to execute a host application;
the UE is configured to execute a client application associated with the host application, thereby providing the user data to be received by the host computer.

D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

The invention claimed is:

1. A method for a wireless device, the method comprising:
receiving, from a network node in a wireless network, control signaling that indicates a parameter configuration for data transmissions, by the network node or by the wireless device, that are associated with a subset of a plurality of hybrid ARQ (HARQ) processes, wherein:
the indicated parameter configuration is one of a plurality of parameter configurations corresponding to a respective plurality of different subsets of the HARQ processes; and
the different subsets include:
a first subset of one or more HARQ processes for which HARQ feedback is disabled, and
a second subset of one or more HARQ processes for which HARQ feedback is enabled.

2. The method of claim 1, wherein the indicated parameter configuration is for one of the following:
a single HARQ process, or
all HARQ processes of a single type.

3. The method of claim 1, wherein the indicated parameter configuration is for one of the following:
all HARQ processes for which the HARQ feedback is enabled, or
all HARQ processes for which the HARQ feedback is disabled.

4. The method of claim 1, wherein the parameter configuration corresponding to the first subset differs from the parameter configuration corresponding to the second subset in one or more of the following parameters:
aggregation factor indicating a number of consecutive slots scheduled by downlink control information;
transmission waveform type;
modulation and coding scheme table;
time domain resource allocation table;
type of frequency resource allocation;
block error rate target;
physical resource block bundling configuration;
type of physical downlink shared channel mapping; or
physical uplink shared channel transmission scheme.

5. The method of claim 1, further comprising transmitting or receiving the data transmissions, associated with the subset of the HARQ processes, according to the indicated parameter configuration.

6. A wireless device comprising:
communication circuitry configured to communicate with a network node in a wireless network; and
processing circuitry operably coupled to the communication circuitry, whereby the processing circuitry and the communication circuitry are configured to perform operations corresponding to the method of claim 1.

7. A method for a wireless device, the method comprising:
transmitting, to a network node in a wireless network, hybrid ARQ (HARQ) feedback for a set of downlink (DL) transmissions by the network node, wherein the HARQ feedback is based on a HARQ feedback codebook that comprises:
a first entry corresponding to a first HARQ process for which HARQ feedback is disabled, the first entry indicating that HARQ feedback for a DL transmission is encoded as a negative acknowledgement; and a second entry corresponding to a second HARQ process for which HARQ feedback is enabled, the second entry indicating that HARQ feedback for a DL transmission is encoded based on a decoding outcome of the DL transmission.

8. The method of claim 7, wherein the HARQ feedback codebook is a Type-1 HARQ-ACK codebook.

9. The method of claim 7, further comprising:
receiving, from the network node via a physical DL control channel (PDCCH), a set of DL control information (DCI) that indicates respective schedules for the set of DL transmissions; and
receiving, from the network node via a physical DL shared channel (PDSCH), the set of DL transmissions according to the respective schedules.

10. The method of claim 9, wherein:
a position of the first entry in the HARQ feedback codebook is based on a slot timing offset included in a DCI that schedules a DL transmission associated with the first HARQ process; and
a position of the second entry in the HARQ feedback codebook is based on a slot timing offset included in a DCI that schedules a DL transmission associated with the second HARQ process.

11. A wireless device comprising:
communication circuitry configured to communicate with a network node in a wireless network; and
processing circuitry operably coupled to the communication circuitry, whereby the processing circuitry and the communication circuitry are configured to perform operations corresponding to the method of claim 7.

12. A method for a network node in a wireless network, the method comprising:
transmitting, to a wireless device, control signaling that indicates a parameter configuration for data transmissions, by the network node or by the wireless device, that are associated with a subset of a plurality of hybrid ARQ (HARQ) processes, wherein:
the indicated parameter configuration is one of a plurality of parameter configurations corresponding to a respective plurality of different subsets of the HARQ processes; and
the different subsets include:
a first subset of one or more HARQ processes for which HARQ feedback is disabled, and
a second subset of one or more HARQ processes for which HARQ feedback is enabled.

13. The method of claim 12, wherein the indicated parameter configuration is for one of the following:
a single HARQ process, or
all HARQ processes of a single type.

14. The method of claim 12, wherein the indicated parameter configuration is for one of the following:
all HARQ processes for which HARQ feedback is enabled, or
all HARQ processes for which HARQ feedback is disabled.

15. The method of claim 12, wherein the parameter configuration corresponding to the first subset differs from the parameter configuration corresponding to the second subset in one or more of the following parameters:
aggregation factor indicating a number of consecutive slots scheduled by downlink control information;
transmission waveform type;
modulation and coding scheme table;
time domain resource allocation table;
type of frequency resource allocation;
block error rate target;
physical resource block bundling configuration;
type of physical downlink shared channel mapping; or
physical uplink shared channel transmission scheme.

16. The method of claim 12, further comprising transmitting or receiving the data transmissions, associated with the subset of the HARQ processes, according to the indicated parameter configuration.

17. A network node in a wireless network, the network node comprising:
communication circuitry configured to communicate with one or more wireless devices; and
processing circuitry operably coupled to the communication circuitry, whereby the processing circuitry and the communication circuitry are configured to perform operations corresponding to the method of claim 12.

18. A method for a network node in a wireless network, the method comprising:
receiving, from a wireless device, hybrid ARQ (HARQ) feedback for a set of downlink (DL) transmissions by the network node, wherein the HARQ feedback is based on a HARQ feedback codebook that comprises:
a first entry corresponding to a first HARQ process for which HARQ feedback is disabled, the first entry indicating that HARQ feedback for a DL transmission is encoded as a negative acknowledgement; and
a second entry corresponding to a second HARQ process for which HARQ feedback is enabled, the second entry indicating that HARQ feedback for a DL transmission is encoded based on a decoding outcome of the DL transmission.

19. The method of claim 18, wherein the HARQ feedback codebook is a Type-1 HARQ-ACK codebook.

20. The method of claim 18, further comprising:
transmitting, to the wireless device via a physical DL control channel (PDCCH), a set of DL control information (DCI) that indicates respective schedules for the set of DL transmissions; and
transmitting, to the wireless device via a physical DL shared channel (PDSCH), the set of DL transmissions according to the respective schedules.

21. The method of claim 20, wherein:
a position of the first entry in the HARQ feedback codebook is based on a slot timing offset included in a DCI that schedules a DL transmission associated with the first HARQ process; and
a position of the second entry in the HARQ feedback codebook is based on a slot timing offset included in the DCI that schedules the DL transmission associated with the second HARQ process.

22. A network node in a wireless network, the network node comprising:
communication circuitry configured to communicate with one or more wireless devices; and
processing circuitry operably coupled to the communication circuitry, whereby the processing circuitry and the communication circuitry are configured to perform operations corresponding to the method of claim 18.

* * * * *